US010484312B2

(12) United States Patent
Gerstenberger et al.

(10) Patent No.: US 10,484,312 B2
(45) Date of Patent: Nov. 19, 2019

(54) METHOD AND DEVICE FOR COMMUNICATION IN A COMMUNICATIONS NETWORK

(71) Applicant: Telefonaktiebolaget LM Ericsson (publ), Stockholm (SE)

(72) Inventors: Dirk Gerstenberger, Stockholm (SE); Daniel Larsson, Solna (SE); Kai-Erik Sunell, Bromma (SE); Henning Wiemann, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/016,220

(22) Filed: Jun. 22, 2018

(65) Prior Publication Data

US 2018/0367473 A1 Dec. 20, 2018

Related U.S. Application Data

(63) Continuation of application No. 15/091,403, filed on Apr. 5, 2016, now Pat. No. 10,153,990, which is a
(Continued)

(51) Int. Cl.
*H04L 12/861* (2013.01)
*H04L 1/18* (2006.01)
(Continued)

(52) U.S. Cl.
CPC ........ *H04L 49/9005* (2013.01); *H04L 1/0079* (2013.01); *H04L 1/1819* (2013.01);
(Continued)

(58) Field of Classification Search
CPC ... H04L 1/0079; H04L 1/1819; H04L 1/1835; H04L 1/1864; H04L 1/1896; H04L 49/9005; H04W 88/06
See application file for complete search history.

(56) References Cited

U.S. PATENT DOCUMENTS 8,286,047 B2 10/2012 Che
8,341,484 B2 12/2012 Parkvall
(Continued)

FOREIGN PATENT DOCUMENTS

EP 2676382 12/2013

OTHER PUBLICATIONS

Chinese Office Action and Search Report and English translation thereof dated Dec. 31, 2015 in CN Application No. 201180071612.4.
(Continued)

*Primary Examiner* — Ankur Jain
(74) *Attorney, Agent, or Firm* — Baker Botts, LLP

(57) ABSTRACT

The embodiments herein relate to a method in a user equipment (605) for communicating with a base station (603) in a communications network (600). The user equipment (605) is configured to communicate with the base station (603) according to a selectable of at least two user equipment categories. The user equipment (605) selects one of the at least two user equipment categories if information indicating the one of the user equipment categories is received from the base station (603). The user equipment (605) selects a default of the user equipment categories if no information indicating which of the user equipment categories is received from the base station (603). The user equipment (605) determines a soft buffer size according to the selected user equipment category. The user equipment (605) communicates with the base station (603) according to the selected user equipment category and applying the determined soft buffer size.

18 Claims, 16 Drawing Sheets

Related U.S. Application Data continuation of application No. 13/393,952, filed as application No. PCT/SE2011/051572 on Dec. 22, 2011, now abandoned.

(60) Provisional application No. 61/475,181, filed on Apr. 13, 2011.

(51) Int. Cl.
*H04L 1/00* (2006.01)
*H04W 88/06* (2009.01)

(52) U.S. Cl.
CPC .......... *H04L 1/1835* (2013.01); *H04L 1/1864* (2013.01); *H04L 1/1896* (2013.01); *H04W 88/06* (2013.01)

(56) References Cited

U.S. PATENT DOCUMENTS

| | | | |
|---|---|---|---|
| 9,253,784 B2* | 2/2016 | Liu | H04L 5/0053 |
| 10,153,990 B2* | 12/2018 | Gerstenberger | H04L 1/1835 |
| 2003/0206524 A1 | 11/2003 | Mohanty | |
| 2005/0207359 A1 | 9/2005 | Hwang | |
| 2006/0200722 A1 | 9/2006 | Braun | |
| 2007/0247469 A1 | 10/2007 | Aberg | |
| 2009/0135965 A1 | 5/2009 | Shen | |
| 2009/0232050 A1 | 9/2009 | Shen | |
| 2010/0135208 A1* | 6/2010 | Ishii | H04W 76/10 370/328 |
| 2010/0199141 A1 | 8/2010 | Parkvall | |
| 2010/0232524 A1 | 9/2010 | Chen | |
| 2011/0013506 A1 | 1/2011 | Ishii | |
| 2011/0199921 A1 | 8/2011 | Damnjanovic | |
| 2011/0296064 A1 | 12/2011 | Ehsan | |
| 2011/0305161 A1 | 12/2011 | Ekpenyong | |
| 2012/0026948 A1 | 2/2012 | Ogawa | |
| 2012/0063358 A1 | 3/2012 | Etemad | |
| 2012/0087396 A1* | 4/2012 | Nimbalker | H04L 1/1822 375/219 |
| 2012/0113831 A1 | 5/2012 | Pelletier | |
| 2012/0163334 A1 | 6/2012 | Miki | |
| 2012/0178439 A1 | 7/2012 | Vashi | |
| 2012/0207130 A1* | 8/2012 | Jang | H04W 8/24 370/331 |
| 2012/0275397 A1 | 11/2012 | Hsieh | |
| 2012/0322455 A1 | 12/2012 | Oh | |
| 2013/0051289 A1 | 2/2013 | Hsieh | |
| 2013/0051490 A1 | 2/2013 | Gupta | |
| 2013/0064103 A1 | 3/2013 | Koskela | |
| 2013/0095816 A1 | 4/2013 | Gerstenberger | |
| 2013/0121216 A1 | 5/2013 | Chen | |
| 2013/0176981 A1* | 7/2013 | Earnshaw | H04L 1/02 370/329 |

OTHER PUBLICATIONS

Russian Patent Office, "Decision on Grant," issued in connection with Russian Patent Application No. 2013150189, dated Sep. 14, 2015.
3GPP TS 36.213, V10.1.0, 3rd Generation Partnership Project; Technical Specification Group Radio Access Network; Evolved Universal Terrestrial Radio Access (E-UTRA); Physical layer procedures (Release 10) Mar. 2011 (115 pages).
Final Office Action dated Feb. 21, 2014 in U.S. Appl. No. 13/375,848.
International Preliminary Report on Patentability dated Oct. 15, 2013 in PCT Application No. PCT/SE2011/051228.
Office Action dated Oct. 9, 2013 in U.S. Appl. No. 13/375,848.
Restriction Requirement dated Aug. 12, 2013 in U.S. Appl. No. 13/375,848.
International Search Report and Written Opinion issued in Application No. PCT/SE2011/051572 dated Jun. 21, 2012.
International Preliminary Report on Patentability dated Jul. 19, 2013 in PCT Application No. PCT/SE2011/051572.
International Search Report and Written Opinion dated Feb. 27, 2012 in corresponding PCT/SE2011/051228.
3GPP TS 36.213, V10.0.0, 3g1 Generation Partnership Project; Technical Specification Group Radio Access Network; Evolved Universal Terrestrial Radio Access (E-UTRA); Physical layer procedures (Release 10) (Dec. 2010).
Research In Motion UK Limited, "DL HARQ Operation During Transmission Mode Change", 3GPP Draft; R2-094287, 3rd Generational Partnership Project (3GPP), Mobile Competence Centre; 650, Route Des Lucioles; F-06921 Sophia-Antipolis Cedex, France, No. Shenzhen, China; Aug. 16, 2009, Aug. 16, 2009.
Qualcomm Incorporation, "Soft Buffer Partitioning for CA", 3GPP Draft; R1-110911, 3rd Generation Partnership Project (3GPP), Mobile Competence Centre; 650, Route Des Lucioles; F-06921 Sophia-Antipolis Cedex, France, vol. RAN WG1, No. Taipei, Taiwan; Feb. 21, 2011, Feb. 15, 2011.
3GPP TS 36.306 V10.0.0; Technical Specification; 3rd Generation Partnership Project; Technical Specification Group Radio Access Network; Evolved Universal Terrestrial Radio Access (E-UTRA); User Equipment (UE) Radio Access Capability (Release 10) (Dec. 2010).
3GPP; Technical Specification Group Radio Access Network; E-UTRA; UE Radio Access Capabilities (Release 10), 3GPP TS 36.306, No. V10.1.0, Mar. 2011, pp. 1-18, XP050477119.
Nokia Siemens Networks et al; "UE Capability Signalling for CA and MIMO in REL10", 3GPP Draft; R2-106892 UE Capability Signaling for CA and MIMO in REL10, vol. RAN WG2, Nov. 15, 2010, Nov. 19, 2010, XP050492565, Chapter 2.1.3. MIMO Capabilities.
Verizon et al; "Discussion on Rel-10 UE Category and CA/MIMO Signaling", 3GPP Draft; R2-110951, vol. RAN WG2, Feb. 21, 2011, Feb. 14, 2011, XP050493545, Chapter 2.1.1.
RAN WG1; "LS on Rel-10 UE Category", 3GPP Draft; R1-105095 LS on REL-10 UE Category, vol. RAN WG1, Aug. 29, 2010, XP050489282, Chapter 2. Proposal on UE Category for Rel-10 Time Frame.
Research in Motion UK Limited: "Clarification of Rel-10 UE Category and MIMO Layer Capability Definition", 3GPP Draft; R2-110224 Clarification of UE Category and MIMO Layer Capability, vol. RAN WG2; Jan. 17, 2011, Jan. 11, 2011, XP050492935, Chapter 2.2 Explicit Signalling in MIMO Layer Capability.
Research in Motion UK Limited: "Discussion on UE Categories and Capabilities", R4-112139, vol. RAN WG4, Apr. 11, 2011, Apr. 6, 2011, XP050502101.
Huawei et al: "UE Capabilities for MIMO", 3GPP Draft; R1-110521 UE Capabilities for MIMO, Jan. 17, 2011, Jan. 20, 2011, XP050490406, Chapter 2 Proposal for MIMO-related UE capabilities.
3GPP 36.212, V10.0.0, 3rd Generation Partnership Project; Technical Specification Group Radio Access Network; Evolved Universal Terrestrial Radio Access (E-UTRA); Multiplexing and channel coding (Release 10) (Dec. 2010).
Support of EDCH Transmission in RRC Connection Procedure in 1.28Mcps TDD; Source to WG: ZTE, CATT; Source to TSG: R2; Change Request; 3GPP TSG-RAN2 Meeting #59bis; Shanghai, China (R2-074031)—Oct. 8-12, 2007.
Clarification on UE Category of Enhanced Cell_FACH for 1.28Mcps TDD; Source to WG: CATT; Source to TSG: R2; Change Request; 3GPP TSG-RAN2 WG2 Meeting #67; Shenzhen, China (R2-094467)—Aug. 24-28, 2009.
Further Clarification on UE Behavior During State Transition From Cell_PCH/URA_PCH to Cell_FACH; Source to WG: Huawei, Hisilicon, Renesas Electronics Europe; Source to TSG: R2; Change Request; 3GPP TSG-RAN2 Meeting #73bis; Shanghai, China (R2-112046)—Apr. 11-15, 2011.
Further Clarification on UE Behavior During State Transition From Cell_PCH/URA_PCH to Cell_FACH; Source to WG: Huawei, HiSilicon, Renesas Mobile Europe; Source to TSG: R2; Change Request; 3GPP TSG-RAN2 Meeting #74; Barcelona, Spain (R2-112709)—May 9-13, 2011.
Communication Pursuant to Article 94(3) EPC for Application No. 11 844 002.3-1874—dated Jan. 3, 2017.

(56) References Cited

OTHER PUBLICATIONS

European Patent Office, Communication pursuant to Article 94(3) EPC, Ref. No. P34282 EP1, Application No. 11844002.3-1220; dated Dec. 6, 2018; 7 pages.

* cited by examiner

| SB0a | SB1a | SB2a | SB3a | SB4a | SB5a | SB6a | SB7a |
|------|------|------|------|------|------|------|------|
| SB0b | SB1b | SB2b | SB3b | SB4b | SB5b | SB6b | SB7b |

Fig. 4

METHOD AND DEVICE FOR COMMUNICATION IN A COMMUNICATIONS NETWORK

PRIORITY

This application is a continuation, under 35 U.S.C. § 120, of U.S. patent application Ser. No. 15/091,403 filed Apr. 5, 2016, which is a continuation, under 35 U,S.C. § 120, of U.S. patent application Ser. No. 13/393,952 filed on Mar. 2, 2012, which is a U.S. National Stage Filing under 35 U.S.C. § 371 of International Patent Application Serial No. PCT/SE2011/051572 filed Dec. 22, 2011, and entitled "METHOD AND DEVICE FOR COMMUNICATION IN A COMMUNICATIONS NETWORK" which claims priority to U.S. Provisional Patent Application No. 61/475,181 filed Apr. 13, 2011, all of which are hereby incorporated by reference in their entirety.

TECHNICAL FIELD

Embodiments herein relate generally to a user equipment and a method in the user equipment, and to a base station and a method in the base station. More particularly the embodiments herein relate to communication in a communications network.

BACKGROUND

In a typical cellular radio system, wireless terminal(s) communicates via a Radio Access Network (RAN) to one or more Core Networks (CN). The wireless terminal is also known as mobile station and or User Equipment (UE), such as mobile telephones, cellular telephones, smart phones, tablet computers and laptops with wireless capability. The user equipment's may be, for example, portable, pocket-storable, hand-held, computer-comprised, or car-mounted mobile devices which communicate voice and, or data via the RAN. In the following, the term user equipment is used when referring to the wireless terminal.

The RAN covers a geographical area via cells, where each cell is being served by a base station, e.g., a Radio Base Station (RBS), which in some networks is also called NodeB, B node, evolved Node B (eNB) or Base Transceiver Station (BTS). The term base station will be used in the following when referring to any of the above examples. A cell is a logical entity. The cell has been assigned a set of logical resources, such as radio channels that provides for radio communication in a geographical area. The base station at a base station site physically realizes the logical cell resources such as transmitting the channels. From a user equipment perspective the network is represented by a number of cells.

In some versions, particularly earlier versions, of the RAN, several base stations are typically connected, e.g., by landlines or microwave, to a Radio Network Controller (RNC). The RNC, also sometimes termed a Base Station Controller (BSC), supervises and coordinates various activities of the plural base stations connected thereto. The radio network controllers are typically connected to one or more CNs.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. Universal Terrestrial Radio Access Network (UTRAN) is essentially a RAN using WCDMA for user equipment's. The Third Generation Partnership Project (3GPP) has undertaken to evolve further the UTRAN and GSM based RAN technologies.

Long Term Evolution (LTE) is a variant of a 3GPP radio access technology wherein the radio base stations are connected directly to a CN rather than to RNC's. In general, in LTE the functions of a RNC are performed by the base station. As such, the RAN of an LTE system has an essentially "flat" architecture comprising base stations without reporting to RNCs.

LTE was introduced in 3GPP with its release 8. Release 9 and release 10 are later releases of LTE. For example, release 8 may be referred to as e.g. rel-8, release 8, LTE release 8 or 3GPP release 8. The terms "codeword," "layer," "precoding," and "beam forming" have been adapted specifically for LTE to refer to signals and their processing. A codeword represents user data before it is formatted for transmission. The term "layer" is synonymous with stream. For Multiple Input Multiple Output (MIMO), at least two layers must be used. Up to eight layers are allowed. The number of layers is always less than or equal to the number of antennas on the base station. Precoding modifies the layer signals before transmission. This may be done for diversity, beam steering, or spatial multiplexing. Beam forming modifies the transmit signals to give the best Carrier to Interference-plus-Noise Ratio (CINR) at the output of the channel.

LTE comprises multi-antenna transmission. The different multi-antenna transmission schemes in LTE correspond to different transmission modes (tm). The different transmission modes differ with regards to the specific structure of antenna mapping, Reference Signals (RS) used for demodulation, and channel state information (CSI) feedback LTE supports nine transmission modes for the DownLink (DL) transmission path. The nine transmission modes are as follows:

Mode 1: Single antenna port.
Mode 2: Transmit diversity.
Mode 3: Open-loop spatial multiplexing.
Mode 4: Closed-loop spatial multiplexing.
Mode 5:Multi User-MIMO (MU-MIMO).
Mode 6: Closed-loop spatial multiplexing, single layer.
Mode 7: Single antenna port, user equipment specific RS.
Mode 8: Single or dual-layer transmission with user equipment specific RS.
Mode 9:Closed loop Single User-MIMO (SU-MIMO) and MU-MIMO.

Modes 1-8 are for LTE release 8/9, and mode 9 is for LTE-Advanced, also referred to as LTE release 10. Mode 9 is a multilayer transmission mode to support closed-loop SU-MIMO and enhanced MU-MIMO support. The transmission modes supported by the base station is decided by the vendor of the base station upon implementation of the base station. The base station configures the transmission mode in the user equipment and hence knows which transmission mode the user equipment is configured with. The spatial multiplexing in mode 3 and 4 is a transmission technique in MIMO wireless communication to transmit independent and separately encoded data signals from each of the multiple transmit antennas.

In LTE, Hybrid Automatic Repeat reQuest (HARQ) with incremental redundancy is used. HARQ is a technique that enables faster recovery from errors in communication networks by storing corrupted data packets in the receiving device rather than discarding them. Even if retransmitted data packets have errors, a good data packet may be derived from the combination of bad ones. Instead of re-transmitting the same portion of the codeword, different redundancy versions are re-transmitted, yielding an extra gain over Chase combining. Ideally, a full soft buffer is available at the receiver side such that the received soft values bits for the entire codeword may be stored. A soft bit is a representation of a measure of how likely it is that the bit is a 0 or 1. However, due to the user equipment complexity and cost concerns, the soft buffer size in a user terminal is limited. For higher rate transmissions, where larger codewords are sent from the transmitter, the user equipment may have only limited buffer space and is not able to store the complete codeword. Therefore, the base station and the user equipment should agree on the soft buffer size. Otherwise, the base station may transmit coded bits the user equipment is not able to store, or worse, the user equipment does not know these are other bits and confuses them with bits it has stored previously.

FIG. 1 depicts in simplified form a complete codeword and also how many soft bits the user equipment may store. FIG. 1 illustrates an enclosed transport block and coded bits stored by the user equipment, i.e. soft buffer size. As seen in FIG. 1, the complete codeword comprises systematic bits and parity bits. The soft buffer size comprises all systematic bits and some of the parity bits of the complete codeword. Parity bits are bits generated by channel coding using a Forward Error Correction (FEC) channel code such as a turbo code. Parity bits may be used in the receiver to detect and correct transmission errors within the error correction/detection capabilities of the channel code. If the base station and the user equipment have the same understanding about the soft buffer size, the base station will not transmit coded bits which the user equipment is not able to store. Instead, the base station only takes those coded bits stored by terminal and uses those bits for (re)transmissions. This is depicted by the circular buffer shown in FIG. 2. The term circular buffer refers to an area in a memory which is used to store incoming data. When the buffer is filled, new data is written starting at the beginning of the buffer and overwriting the old. The code word, i.e. the systematic bits and the parity bits, are stored in the circular buffer. FIG. 2 illustrates the bits used in a first transmission and re-transmissions, derived from the circular buffer. The size of the circular buffer matches the soft buffer size of the user equipment. The complete circle corresponds to the soft buffer size and not to the entire codeword. In the first transmission, depending on the code rate, some or all systematic bits, and none or some parity bits are transmitted. In a retransmission the starting position is changed and bits corresponding to another part of the circumference, e.g. another point in the circular buffer, are transmitted.

In LTE release 8 using Frequency-Division Duplexing (FDD), each user equipment has up to 8 HARQ processes. Each HARQ process may comprise up to two sub-processes for supporting dual-codeword MIMO transmissions. LTE release 8 divides the available soft buffer equally into the configured number of HARQ processes. Each of the divided soft buffers may be used to store soft values of the received codewords. In case of dual-codeword MIMO transmission, the divided soft buffer is further divided equally to store the soft values of the two received codewords.

A Soft Buffer (SB) allocation for the single-codeword transmission modes is illustrated in FIG. 3. FIG. 3 illustrates eight allocated soft buffers, where SB0 illustrates a first soft buffer for a first codeword, SB1 illustrates a second soft buffer for a second codeword, SB2 illustrates a third soft buffer for a third codeword etc. FIG. 3 shows soft buffer allocation in LTE release 8 when the Physical Downlink Shared Channel (PDSCH) transmission mode is other than mode 3, 4 or 8. It may be observed that there is a buffer reserved for each codeword.

The soft buffer allocation for the dual-codeword transmission modes is illustrated in FIG. 4. FIG. 4 illustrates sixteen allocated soft buffers, where SB0a illustrates a first buffer for a first codeword, SB0b illustrates a second buffer for a second codeword, SB1a illustrates a third buffer for a third codeword, SB1b illustrates a fourth soft buffer for a fourth codeword etc. The soft buffer applies to a codeword. The codeword is a term used for the coded bits associated with a transport block. FIG. 4 shows soft buffer allocation in LTE release 8 when the PDSCH transmission mode is mode 3, 4 or 8.

The buffer reserved for each codeword is only half of the previous operating case. The soft buffer limitation problem is particularly acute in dual-codeword MIMO transmission operations. This limitation reduces the effectiveness of soft combining gains from incremental redundancy retransmissions.

Carrier Aggregation. The LTE release 8 supports bandwidths up to 20 Mega Hertz (MHz). However, in order to meet the International Mobile Telecommunications-Advanced (IMT-Advanced) requirements, 3GPP has initiated work on LTE release 10. One part of LTE release 10 is to support bandwidths larger than 20 MHz. An important requirement for LTE release 10 is to assure backward compatibility with LTE release 8, including spectrum compatibility. As a result, a carrier or LTE release 10, which is wider than 20 MHz, should appear as a number of smaller LTE carriers to a user equipment of LTE release 8. Each such carrier may be referred to as a component carrier. For early LTE release 10 deployments, it may be expected that there will be a smaller number of LTE release 10 capable user equipment's compared to many LTE legacy user equipment's. Therefore, it is desirable to assure an efficient use of a wide carrier by legacy user equipment's, which means that it should be possible to implement carriers where legacy user equipment's may be scheduled in all parts of the wideband LTE release 10 carrier. One way to achieve this would be using carrier aggregation. The term legacy refers to that the user equipment continues to be used, typically because it still functions for the users' needs, even though newer technology or more efficient technology is available.

Carrier aggregation implies that a LTE release 10 user equipment may receive multiple component carriers, where the component carriers have, or at least can have, the same width as a LTE release 8 carrier. An example of carrier aggregation is illustrated in FIG. 5. The x-axis of FIG. 5 denotes the width of the spectrum 501 used for the five component carriers 505 and the y-axis defines the energy per frequency unit 510.

Soft Buffer Operation in Carrier Aggregation. In LTE each component carrier operates with its own set of HARQ processes. Since the total soft buffer memory needs to be shared among component carriers, the soft buffer size per component carrier may vary depending on the number of configured component carriers and the configured MIMO transmission modes for each component carriers. The available soft buffer size for each codeword also depends on how the soft buffer is divided and allocated amongst all codewords.

Multi-Antenna Support in LTE. Multi-antenna capabilities are included already in LTE release 8, and are important enablers for high data rates, improved coverage and capacity. The multiple antennas at transmitters and receivers may be used in different ways. Diversity techniques are used to improve the robustness of the link, and beamforming techniques may be used to improve the coverage. Spatial multiplexing provides means to enhance the spectral efficiency of the link and may improve the performance of the whole system if properly designed. Peak rates may be substantially increased using spatial multiplexing and may ideally be increased proportionally to the minimum number of transmit and receive antennas of the link provided that the Signal-to-Noise-Ratio (SNR) is high enough and that the channel conditions are beneficial. Realistic gains are highly channel dependent, e.g. they require a high SNR and beneficial interference situations of the relevant link, but may be substantially improved provided that the SNR is sufficiently high. Examples are low system load scenarios or when the user equipment is close to the cell center.

The downlink of LTE release 8 supports SU-MIMO spatial multiplexing of up to four layers via codebook based precoding. In addition, transmit diversity modes as well as beamforming with single-layer transmission are supported in the downlink of LTE release 8. In LTE release 9, an enhanced downlink transmission mode is introduced in which the beamforming functionality is extended to also support dual-layer transmission, and in which MU-MIMO operation is offered where different layers are transmitted to different user equipment's. The LTE release 8/9 uplink multi-antenna support is limited to user equipment antenna selection, which is optional in all user equipment categories. The user equipment categories will be described in more detail below.

User Equipment Category Signalling. User equipment's may be categorized in different user equipment categories, called UE categories or UE classes, which defines the overall performance and capabilities of the user equipment. The user equipment categories are needed to ensure that the base station may communicate correctly with the user equipment. By letting the base station know the user equipment category, it is able to determine the performance of the user equipment and communicate with it accordingly. Accordingly, the base station will not communicate beyond the performance of the user equipment. Different values of a buffer size are associated with each user equipment category. The user equipment category may be referred to as UE category in some of the figures.

In LTE release 8/9, there are five user equipment categories, 1-5. LTE release 10 has three additional categories, 6-8, i.e. in all eight user equipment categories for the releases, as shown in Table 1 below. The column 1 comprises the user equipment categories 1-8. The column 2 illustrates that user equipment categories 1-5 are related to LTE release 8/9 and the column 3 illustrates that user equipment categories 1-8 are related to LTE release 10.

TABLE 1

User Equipment Categories

| 1. User Equipment Category | 2. LTE release 8/9 | 3. LTE release 10 |
| --- | --- | --- |
| 1 | X | X |
| 2 | X | X |
| 3 | X | X |
| 4 | X | X |
| 5 | X | X |
| 6 |   | X |
| 7 |   | X |
| 8 |   | X |

Table 2 below shows user equipment categories related to LTE release 8/9/10. Column 1, i.e. the left most column, comprises the LTE releases, and column 2 comprises the user equipment categories 1-8. Column 3 comprises the maximum number of Downlink-Shared Channel (DL-SCH) transport block bits received within a Transmission Time Interval (TTI). Column 4 comprises the maximum number of bits of a DL-SCH transport block received within a TTI. Column 5 comprises the total number of soft channel bits. Column 6 comprises the maximum number of supported layers for spatial multiplexing in DL. As mentioned earlier, spatial multiplexing is a transmission technique in MIMO wireless communication to transmit independent and separately encoded data signals from each of the multiple transmit antennas.

TABLE 2

User Equipment categories supported in LTE release 8/9/10

| 1. LTE release | 2. User Equipment Category | 3. Maximum number of DL-SCH transport block bits received within a TTI | 4. Maximum number of bits of a DL-SCH transport block received within a TTI | 5. Total number of soft channel bits | 6. Maximum number of supported layers for spatial multiplexing in DL |
| --- | --- | --- | --- | --- | --- |
| Release 8/9/10 | 1 | 10296 | 10296 | 250368 | 1 |
|  | 2 | 51024 | 51024 | 237248 | 2 |
|  | 3 | 102048 | 75376 | 1237248 | 2 |
|  | 4 | 150752 | 75376 | 1827072 | 2 |
|  | 5 | 299552 | 149776 | 3667200 | 4 |
| Release 10 only | 6 | 301504 | 149776 (4 layers) 75376 (2 layers) | 3654144 | 2 or 4 |
|  | 7 | 301504 | 149776 (4 layers) 75376 (2 layers) | 3654144 | 2 or 4 |
|  | 8 | 2998560 | 2998560 | 35982720 | 8 |

As seen from table 2, the different user equipment categories are associated with e.g. a total number of soft channel bits and a maximum number of supported layers for spatial multiplexing in downlink. A user equipment of LTE release 10 supports transmission mode 9 and an 8 layer transmission is only possible with transmission mode 9.

The definition of user equipment categories related to LTE release 10 builds upon the principles used in LTE release 8/9, where the number of user equipment categories is limited to avoid fragmentation of user equipment implementation variants in the market. The user equipment categories related to LTE release 10 are defined in terms of peak rate, ranging from 10, 50, 100, 150 and 300 Mbps up to about 3 Gbps in the downlink.

Different realizations of the peak rates are possible within a user equipment category. For example, in user equipment categories 6 and 7, it is possible to either support two layers of MIMO together with carrier aggregation of 40 MHz, or four layers of MIMO with a single carrier of 20 MHz. Both configurations support up to 300 Mbps. The user equipment categories related to LTE release 8/9 are reused, supporting, e.g. aggregation of two component carriers with up to 10 MHz bandwidth each for a user equipment of user equipment category 3. The user equipment signals the number of supported MIMO layers for each band combination, in line with the requirements from the user equipment categories. While it is expected that additional user equipment categories may be defined in the future, LTE release 10 supports a high-end user equipment category combining aggregation of five component carriers of 20 MHz each with eight layer MIMO, which supports a total peak data rate of about 3 Gbps for LTE-Advanced.

A LTE release 10 user equipment may indicate two user equipment categories: a user equipment category relating to LTE release 8/9, e.g. user equipment category 5, and a user equipment category relating to LTE release 10, e.g. user equipment category 8. A problem is that a base station supporting LTE release 8/9 may only detect the user equipment category relating to LTE release 8/9, while a base station supporting LTE release 10 would detect both the user equipment category relating to LTE release 8/9 and the user equipment category relating to LTE release 10. A similar problem may also occur if the user equipment relates to a user equipment category 6/7 in a base station supporting LTE release 10, when it indicates a user equipment category 4 relating to LTE release 8/9.

As the user equipment is not aware of the LTE release of the base station it does not know whether to operate according to the user equipment category relating to LTE release 8/9, e.g. category 5, or the category relating to LTE release 10, e.g. category 8. This has serious consequences, as the user equipment would operate differently, depending on the user equipment category. As may be seen from the Table 2, the soft buffer sites for the two user equipment categories differ. This may result in that the user equipment and base station using different soft buffer size, which leads to corruption of the channel coding, as the rate matching in the base station and the user equipment would be done according to different soft buffer sites. As a result, the user equipment will not be able to receive data on the PDSCH. The coding protection will not help as the encoded bits will be interleaved into the wrong place.

SUMMARY

An object of embodiments herein is therefore to obviate at least one of the above disadvantages and to provide improved communication between a user equipment and a base station in a communications network.

According to a first aspect, the object is achieved by a method in a user equipment for communicating with a base station in a communications network. The user equipment is configured to communicate with the base station according to a selectable of at least two user equipment categories. The user equipment selects one of the at least two user equipment categories if information indicating the one of the at least two user equipment categories is received from the base station. If no information indicating which of the at least two user equipment categories is received from the base station, the user equipment selects a default of the at least two user equipment categories. The user equipment determines a soft buffer size of a soft buffer comprised in the user equipment according to the selected user equipment category. The user equipment communicates with the base station according to the selected user equipment category and applying the determined soft buffer size.

According to a second aspect, the object is achieved by a method in a base station for communicating with a user equipment in a communications network. The base station is configured to communicate with the user equipment according to a selectable of at least two user equipment categories. The base station determines a soft buffer size of a soft buffer comprised in the user equipment, based on information indicating one of the at least two user equipment categories. The base station communicates with the user equipment according to the one of the at least two user equipment categories and applying the determined soil buffer size.

According to a third aspect, the object is achieved by a user equipment for communicating with a base station in a communications network. The user equipment is configured to communicate with the base station according to a selectable of at least two user equipment categories. The user equipment comprises a selecting unit configured to select one of the at least two user equipment categories if information indicating the one of the at least two user equipment categories is received from the base station. The selecting unit is further configured to select a default of the at least two user equipment categories if no information indicating which of the at least two user equipment categories is received from the base station. The user equipment comprises a determining unit configured to determine a soft buffer size of a soft buffer comprised in the user equipment according to the selected user equipment category. The user equipment comprises a communicating unit configured to communicate with the base station according to the selected user equipment category and applying the determined soft buffer size.

According to a fourth aspect, the object is achieved by a base station for communicating with a user equipment in a communications network. The base station is configured to communicate with the user equipment according to a selectable of at least two user equipment categories. The base station comprises a determining unit which is configured to, based on information indicating one of the at least two user equipment categories, determine a soft buffer size of a soft buffer comprised in the user equipment. The base station further comprises a communicating unit configured to communicate with the user equipment according to the one of the at least two user equipment categories and applying the respective soft buffer size.

Since the user equipment communicates with the base station according to the selected user equipment category and applies the determined soft buffer size, they have a common understanding of the soft buffer size which they shall apply in their communication. Thereby, the communication between the user equipment and base station in the communications network is improved.

Embodiments herein afford many advantages, of which a non-exhaustive list of examples follows:

An advantage of the embodiments herein is that they allow a user equipment of LTE release 10 to operate in a legacy network.

An advantage of the embodiments herein is that it allows the introduction in a backward compatible way of user equipment categories related to LTE release 10 with a different soft buffer size compared to the user equipment categories related to previous releases.

A further advantage is that the embodiments herein allow the introduction of a new user equipment category(s) with a different soft buffer size than in previous release. These new user equipment categories may then both function in a network of an old release and a network of the new release.

An advantage of the embodiments herein is that as the user equipment is aware of the release of the base station, it knows whether to operate according to the user equipment category relating to LTE release 8/9, e.g. category 5, or the user equipment category relating to LTE release 10, e.g. category 8. This results in the user equipment and base station using the same soft buffer size, which avoids corruption of the channel coding, as the rate matching in the base station and the user equipment would be done according to the same soft buffer sizes. As a result, the user equipment is able to receive data on PDSCH.

A further advantage of the embodiments herein is that they increase the effectiveness of the communications network, in addition to improving the coverage, capacity and performance of the network.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which:

FIG. 4 is a schematic diagram showing soft buffer allocation in LTE release 8 when the PDSCH transmission mode is mode 3, 4 or 8.

Figure 1:
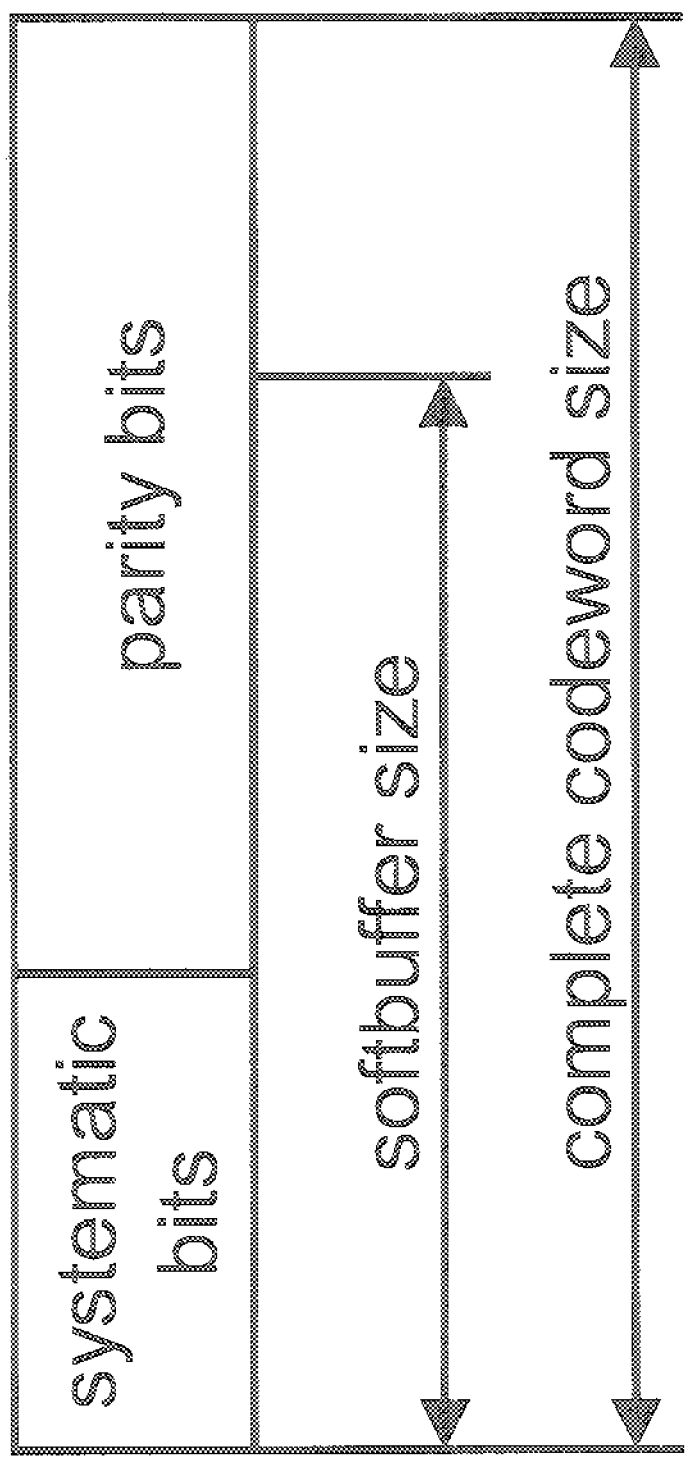
FIG. 1 is a schematic diagram showing of an encoded transport block and coded bits stored by a user equipment, i.e. soft buffer size.
Figure 2:
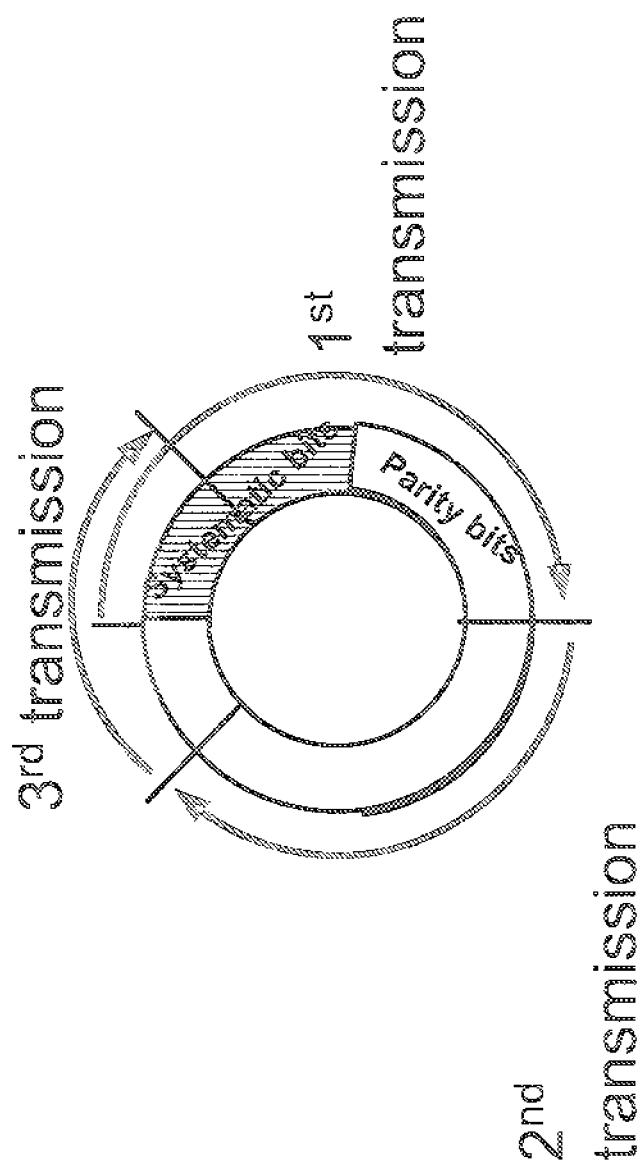
FIG. 2 is a schematic diagram showing that bits used in the first transmission and re-transmissions are derived from a circular buffer, the size of the circular buffer matching the soft buffer size of the user.
Figure 3:
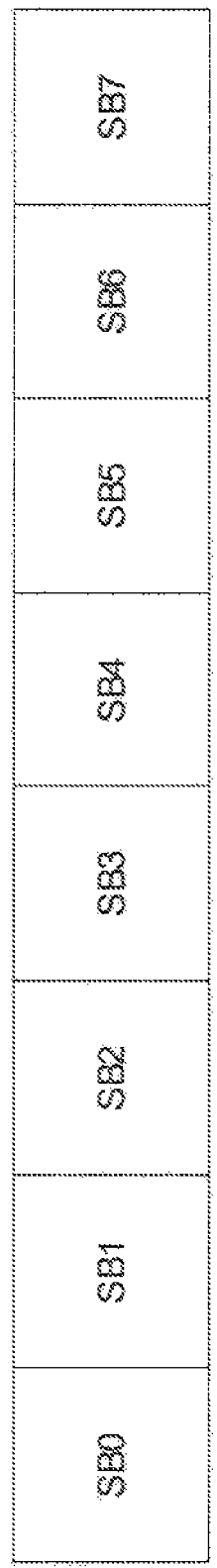
FIG. 3 is a schematic diagram showing soft buffer allocation in LTE release 8 when the PDSCH transmission mode is other than mode 3, 4 or 8.
Figure 5:
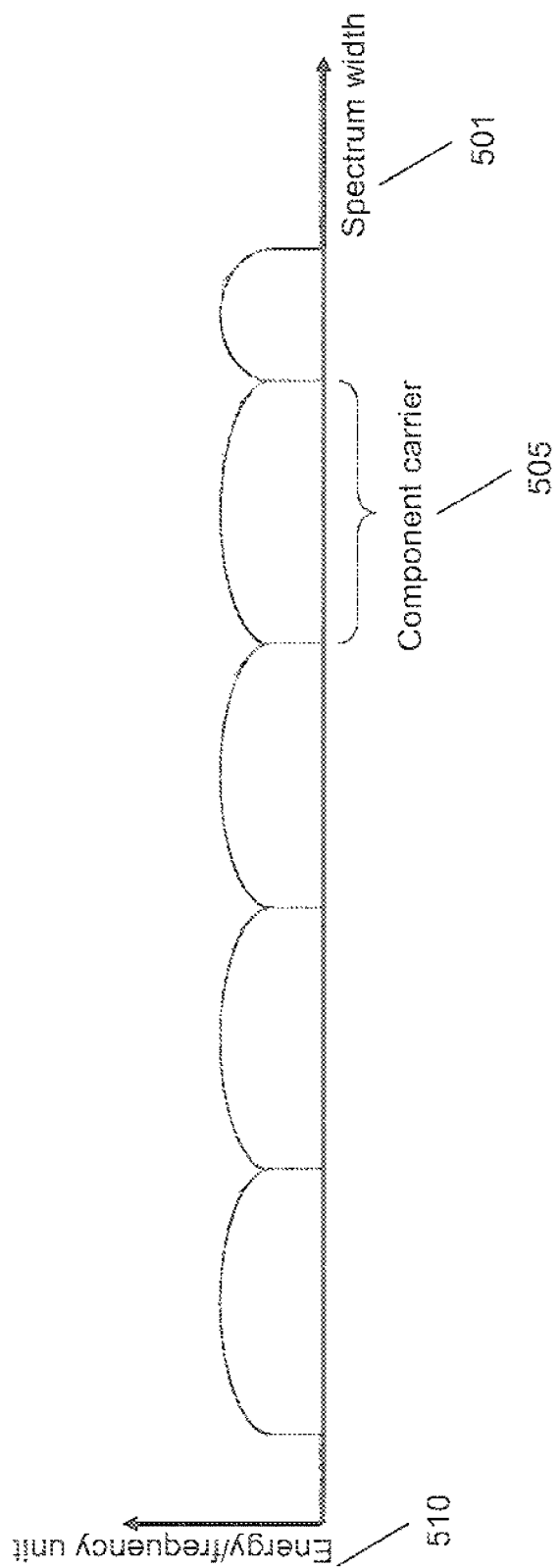
FIG. 5 is a schematic diagram illustrating carrier aggregation.

The foregoing and other objects, features, and advantages of the embodiments herein will be apparent from the following more particular description of preferred embodiments as illustrated in the accompanying drawings in which reference characters refer to the same parts throughout the various views. The drawings are not necessarily to scale, and the dimensions of certain features may have been exaggerated for the sake of clarity. Emphasis is instead being placed upon illustrating the principles of the embodiments herein.

DETAILED DESCRIPTION

Figure 6:
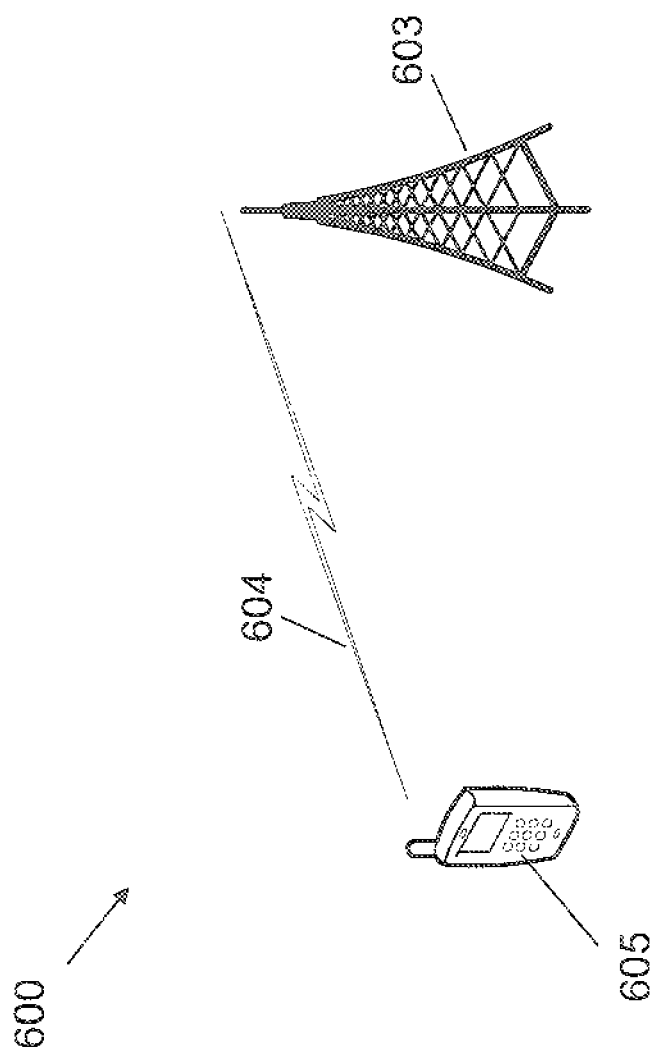
FIG. 6 is a schematic block diagram illustrating embodiments of a communications network.

FIG. 6 depicts a communications network 600 in which embodiments herein may be implemented. The communications network 600 may in some embodiments apply to one or more radio access technologies such as for example LTE, LTE Advanced, WCDMA, GSM, Worldwide Interoperability for Microwave Access (WiMAX), or any other 3GPP radio access technology.

The communications network 600 comprises a base station 603 serving a cell. The base station 603 may be a base station such as a NodeB, an eNodeB, or any other network unit capable to communicate over a radio carrier 604 with a user equipment 605 being present in the cell. The base station 603 may be of LTE release 8/9 or LTE release 10. The base station 603 may be referred to as BS in some of the figures.

The user equipment 605 may be any suitable communication device or computational device with communication capabilities capable to communicate with the base station over a radio channel, for instance but not limited to mobile phone, smart phone, personal digital assistant (PDA), tablet computer, laptop, MP3 player or portable DVD player (or similar media content devices), digital camera, or even stationary devices such as a PC. A PC may also be connected via a mobile station as the end station of the broadcast or multicast media. The user equipment 605 may also be an embedded communication device in e.g. electronic photo frames, cardiac surveillance equipment, intrusion or other surveillance equipment, weather data monitoring systems, vehicle, car or transport communication equipment, etc. The user equipment 605 is referred to as UE in some of the figures. The user equipment 605 may be of LTE release 8/9 or LTE release 10.

There is a limitation on the size of memory in the user equipment 605 for the soft buffer due to the cost of memory. The base station 603 knows how much memory the user equipment 605 has and encodes the data on PDSCH according to this. Then the user equipment 605 receives data from the base station 603 and decodes the data with the same understanding. If the base station 603 and the user equipment 605 would have different understanding of memory size for storing bits, the bits will end up at the wrong place in the interleaving or de-interleaving process, depending on if it is the base station 603 or the user equipment 605 that is doing the error. If the bits have ended up in the wrong place in the interleaving or de-interleaving process, it will result in that the data is un-decodeable. Hence both the base station 603 and the user equipment 605 need to determine the soft buffer size in some way.

As mentioned above the user equipment 605 of LTE release 8/9 is associated with user equipment categories 1-5. The user equipment 605 when being of LTE release 10 may be associated with one of three additional user equipment categories, 6-8, i.e. be associated is here meant that the user equipment 605 is arranged for operation according to this user equipment category. The user equipment 605 of LTE release 10 is allowed to signal for example one user equipment category or two user equipment categories to the base station 603, independent of which LTE release the base station 603 supports. In the example where the user equipment 605 of LTE release 10 signals one user equipment category, the user equipment 605 may also indicate a different number of MIMO layers than what is possible in LTE release 8/9.

For example, a user equipment 605 of user equipment category 6 or 7 relating to LTE release 10 also signals the user equipment category 4. If the base station 603 is of LTE release 8/9, the base station 603 will only understand that the user equipment 605 is of user equipment category 4. This is because the information on the user equipment category 6 as signalled by the user equipment 605 has a format that a base station 603 of an older release, i.e. LTE release 8/9, does not understand and simply discards this part of the information that relates to the user equipment category 6 In another example, a user equipment 605 of user equipment category 8 relating to LTE release 10 also signals information on user equipment category 5 and that is not understood by the base station 603 of older release.

The two user equipment categories, for example user equipment categories 4 and 8 or user equipment categories 5 and 8 that the user equipment 605 is arranged to operate according requires separate sizes of soft buffers.

In one embodiment the common understanding between the base station 603 and the user equipment 605 of what user equipment category to apply when two have been informed of by the user equipment 605, is based on what transmission mode is used for the communication. There are transmission modes 1-9 and one of which is applied for the communication between the base station 603 and the user equipment 605. Decisive for what user equipment category to apply is typically whether the user equipment 605 is configured with transmission mode 9 or not. This is because transmission mode 9 is the one of the transmission modes that is solely used in release 10 and not in any earlier releases.

The base station 603 configures the transmission mode in the user equipment 605 and hence knows which transmission mode the user equipment 605 is configured with. Consider the example where the user equipment 605 is of user equipment category 4 and user equipment category 6. If the base station 603 is of LTE release 10, the base station 603 will understand that the user equipment 605 is of both user equipment category 4 and user equipment category 6. However, the user equipment 605 will still only use the soft buffer size associated with user equipment category 4 since it is configured in one of the transmission modes 1-8. The user equipment 605 does not know if the base station 603 has understood that the user equipment 605 is of both user equipment category 4 and 6. In other words, the user equipment 605 will apply a soft buffer size corresponding to its user equipment category relating to LTE release 8/9 if it is configured with a transmission mode that is only available in LTE release 8/9.

The user equipment 605 may as default be configured with a default transmission mode depending on the antenna configuration of the base station 603, unless the user equipment 605 has been configured in any other transmission mode by the base station 603 after initial access to the network 600. The only way for the user equipment 605 to apply its soft buffer size associated with its e.g. user equipment category 6 is if the user equipment 605 is configured in transmission mode 9. As mentioned above, transmission mode 9 is related to LTE release 10. Transmission mode 9 does not exist in a previous earlier release of LTE, such as e.g. LTE release 8. Hence, if the base station 603 supports transmission mode 9 it may be assumed that the base station 603 is of LTE release 10 in this respect, and vice versa.

Note that a transmission mode may change during a communication session between the user equipment 605 and the base station 603. This change needs to be done both at the base station 603 and the user equipment 605 side. The procedure for this is as follows. The base station 603 sends a Radio Resource Control (RRC) reconfiguration message to the user equipment 605 instructing it to change transmission mode. The user equipment 605 receives this message and has e.g. 15 ms of time to apply this message. During this 15 ms of time it is essentially undefined if the user equipment 605 is in the new transmission mode or in the old transmission mode. The user equipment 605 will after applying the new transmission mode send an RRC configuration complete message to the base station 603 to indicate that it has applied the new transmission mode. In principle the same behaviour is also the case when the user equipment 605 is configured with more or less component carriers. The RRC protocol handles the control plane signaling of Layer 3 between the User Equipment and the UTRAN.

The method for the user equipment 605 to communicate with the base station 603 in a communications network 600, where the base station 603 and the user equipment 605 have a common understanding of the soft buffer size, will now be described with reference to the examples shown in the combined signalling diagrams and flowcharts depicted in FIGS. 7*a-d*.

Figure 7A:
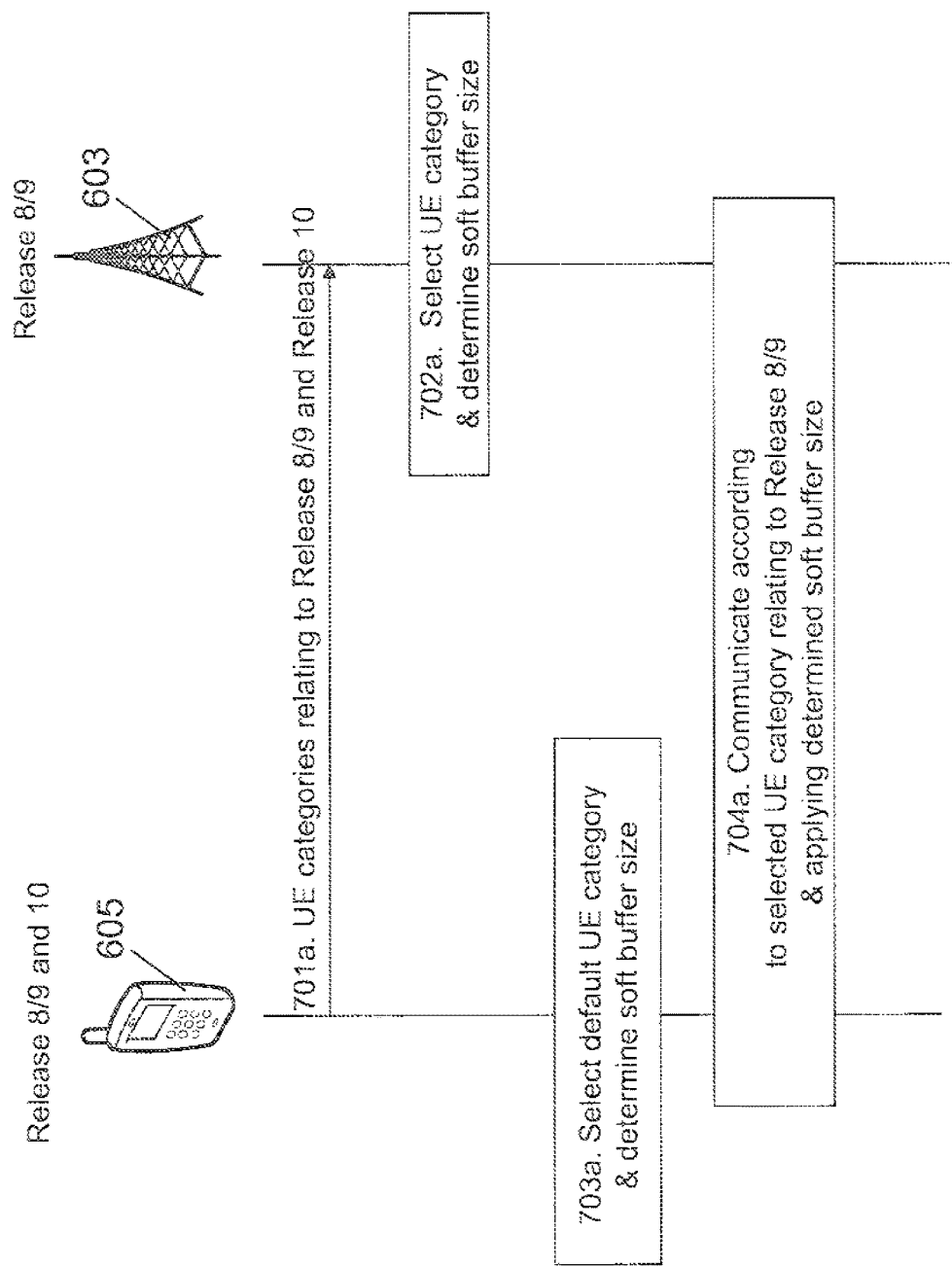
FIG. 7a-d are signaling diagrams illustrating embodiments of a method.

FIG. 7*a* illustrates an example of an embodiment where the base station 603 is of LTE release 8/9. In the following example, the user equipment 605 is of the user equipment categories 5 and 8. The method comprises the following steps, which steps may as well be carried out in another suitable order than described below.

Step 701*a*

The user equipment 605 signals information about its capability to act according to at least two user equipment categories related to different LTE releases to the base station 603. One user equipment category relates to LTE release 8/9 and another of the user equipment categories relates to LTE release 10. As an example related to FIG. 7*a*, the user equipment category relating to LTE release 8/9 may be category 5, and the user equipment category relating to LTE release 10 may be category 8. By letting the base station 603 know the user equipment category, it is able to determine the performance of the user equipment 605 and communicate with it accordingly.

As the base station 603 in this example is of the LTE release 8/9 and thus supports transmission modes 1-8, the LTE release 8/9 base station 603 has capabilities to detect the user equipment category relating to LTE release 8/9, user equipment category 5 in this example. These capabilities to detect the user equipment categories relating to LTE release 8/9 are predefined in the base station 603.

Step 702*a*

The base station 603 selects the user equipment category relating to LTE release 8/9 as is the only one detected by the base station 603 in the example where user equipment, category 5 is selected. The base station 603 determines the soft buffer size based on the selected user equipment category, e.g. category 5, and applies it in the further communication with the user equipment 605.

Step 703*a*

The user equipment 605 has not been provided with any information from the base station 603 indicating which user equipment category it should select. Therefore, as a default, the user equipment 605 selects its default user equipment category which is the one that relates to LTE release 8/9, i.e. user equipment category 5 in this example. The user equipment category 5 is supported by both the base station 603 of LTE release 8/9 and the base station 603 of LTE release 10. The user equipment 605 does not know if the base station 603 has understood that the user equipment 605 is of both user equipment category 5 and 8. Based on the selected default user equipment category 5, the user equipment 605 determines the soft buffer size. The selected default user equipment category and related soft buffer size may be permanent or temporarily, until changed by the base station 603, e.g. upon request.

The selected default user equipment category 5 and the corresponding soft buffer size may be preconfigured in the user equipment 605.

Step 704*a*

As mentioned above, the user equipment 605 and the base station 603 communicate according to the selected default user equipment category and that relates to LTE release 8/9, e.g. category 5, when no other instructions or requests are received from the base station 603. The user equipment 605 and the base station 603 apply the determined soft buffer size in the communication Since both the user equipment 605 and the base station 603 apply the soft buffer size, i.e. the soft buffer size according to LTE release 8/9, they have a common understanding of the soft buffer size which they shall apply in their communication, and thereby improved communication between the user equipment 605 and base station 603 in the communications network 600 is provided.

Figure 7B:
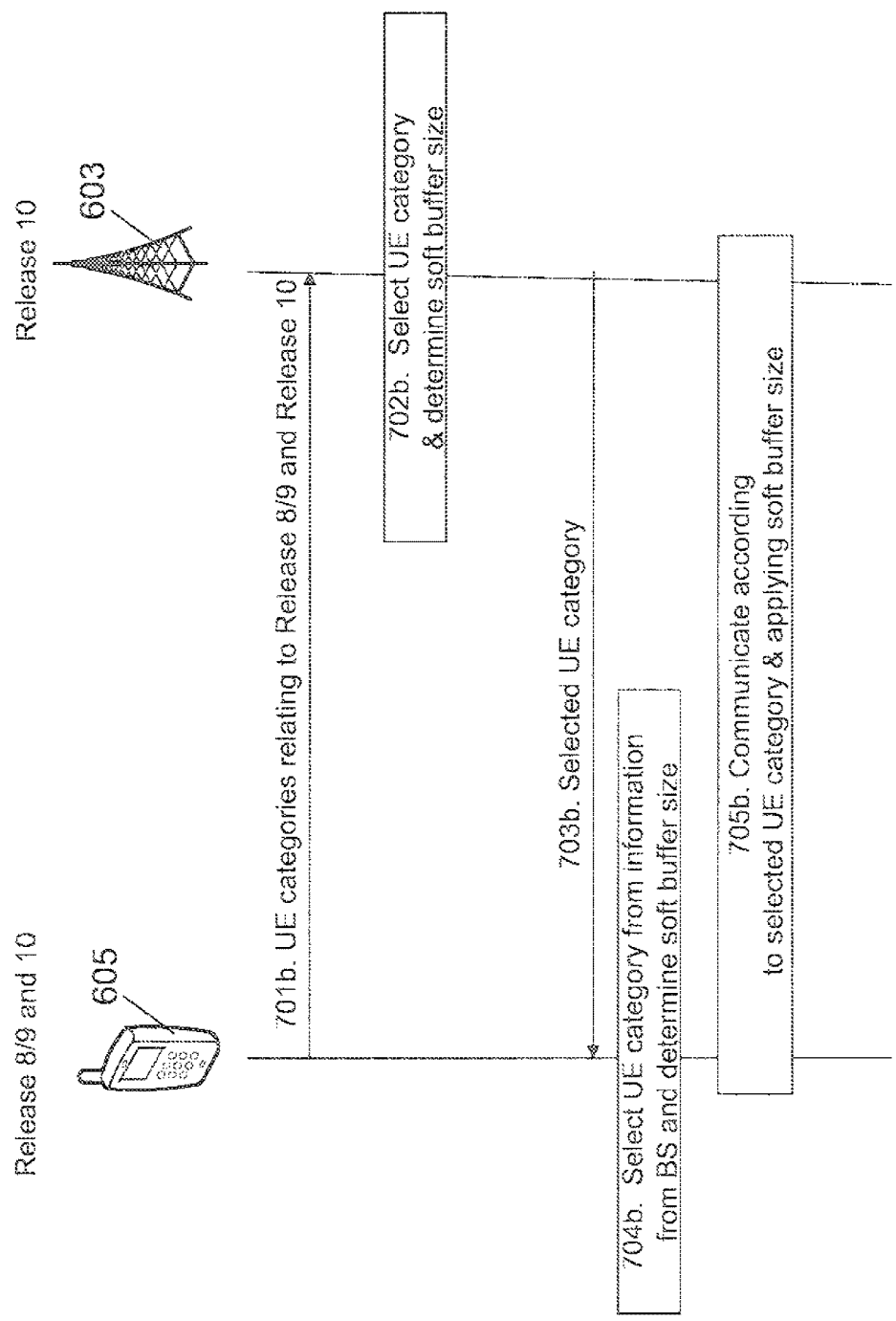

FIG. 7b illustrates an example of an embodiment where the base station 603 is of LTE release 10. The difference between FIGS. 7b and 7a is that the base station 603 in FIG. 7b is of LTE release 10, while the base station 603 in FIG. 7a is of LTE 1, release 8/9. In this example, compared to the example illustrated in FIG. 7a, the base station 603 sends information indicating a selected user equipment category to the user equipment 605. In the following example, the user equipment 605 is of the user equipment categories 5 and 8. The method comprises the following steps, which steps may as well be carried out in another suitable order than described below.

Step 701b

This step corresponds to step 701a in FIG. 7a.

The user equipment 605 signals information about its capability to act according to at least two user equipment categories. One user equipment category relates to LTE release 8/9 and another of the user equipment categories relates to LTE release 10. As an example, the user equipment category relating to LTE release 8/9 may be user equipment category 3, and the user equipment category relating to LTE release 10 may be user equipment category 8. By letting the base station 603 know the user equipment category, it is able to determine the performance of the user equipment 605 and communicate with it accordingly.

As the base station 603 in this example is of the LTE release 10, the base station 603 has capabilities to detect both the user equipment category relating to LTE release 8/9 and the user equipment category relating to LTE release 10, e.g. user equipment category 5 and user equipment category 8. These capabilities to detect both user equipment categories are predefined in the base station 603.

Step 702b

This step corresponds to step 702a in FIG. 7a.

The base station 603 selects which user equipment category the user equipment 605 shall apply for/in its operation, among the two user equipment categories that the user equipment 605 has capability to handle according to the signaled information in step 701b. In this example, the base station 603 is of LTE release 10 and therefore the user equipment category 8 is selected among the two alternatives of user equipment category 5 and user equipment category 8. The base station 603 also determines which soft buffer size it shall apply in its communication with the user equipment 605, based on the selected user equipment category, e.g. 8.

Step 703b

According to this embodiment the base station 603 signals to the user equipment 605 via the RRC protocol information indicating which of the user equipment categories that are selected by the base station 603 in step 703b for use in the further communication with the user equipment 605.

This step may be omitted in case the user equipment category as selected by the base station 603 is a user equipment category that is to be used as default if no information indicate the selected user equipment category is sent to the user equipment 605, as illustrated in FIG. 7a. The default user equipment category has to be predefined in both the user equipment 605 and the base station 603 for the common understanding of what user equipment category to apply.

Step 704b

The user equipment 605 determines a soft buffer size to be applied in its communication with the base station 603. The determining is based on information indicating the selected user equipment category received from the base station 603.

Should the step 703b be omitted, the user equipment 605 selects the user equipment category to be the default user equipment category, and determines a soft buffer size based on the selected user equipment category, as illustrated in FIG. 7a.

Step 705b

This step corresponds to step 704a in FIG. 7a.

The user equipment 605 and the base station 603c communicate according to the selected user equipment category and apply the soft buffer size according to the selected user equipment category, e.g. user equipment category 8 in the communication between the base station 603 and the user equipment 605. Since both the user equipment 605 and the base station 603 apply the same soft buffer size they have a common understanding of the soft buffer size which they shall apply in their communication, and thereby improved communication between the user equipment 605 and base station 603 in the communications network 600 is provided.

Figure 7C:
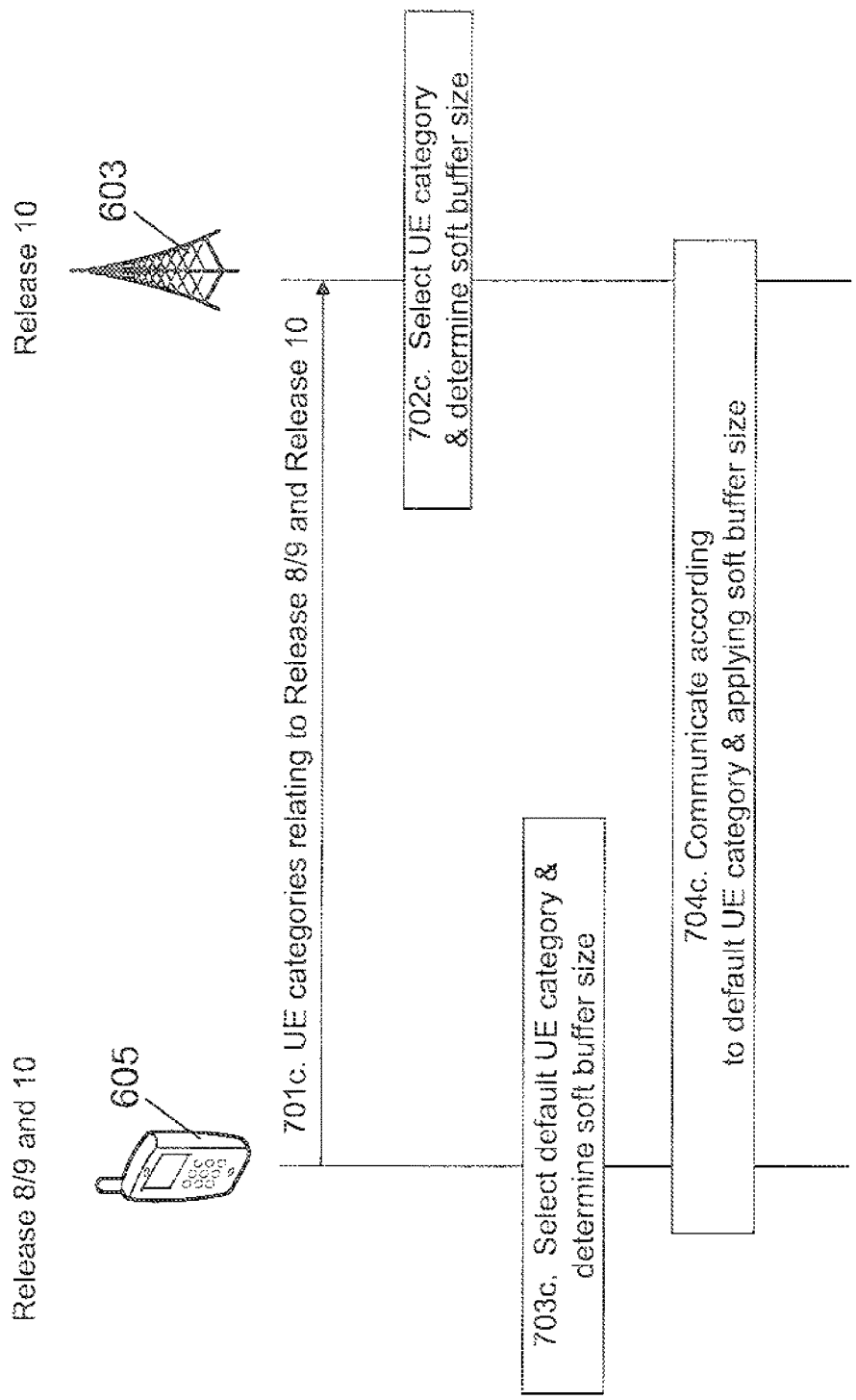

FIG. 7c illustrates an example of an embodiment where the base station 603 is of LTE release 10. One difference between FIGS. 7c and 7a is that the base station 603 in FIG. 7c is of LTE release 10 and the base station 603 in FIG. 7a is of LTE release 8/9. Another difference between FIG. 7c and FIG. 7b is that signalling of the selected user equipment category in FIG. 7b is not present in FIG. 7c. In the following example, the user equipment 605 is of the user equipment categories 5 and 8. The method comprises the following steps, which steps may as well be carried out in another suitable order than described below.

Step 701c

This step corresponds to step 701a in FIG. 7a and step 701b in FIG. 7b.

The user equipment 605 signals information about its capability to act according to at least two user equipment categories, one relating to LTE release 8/9 and the other user equipment category relating to LTE release 10, to the base station 603. As mentioned above, the user equipment category relating to LTE release 8/9 may be user equipment category 5, and the user equipment category relating to LTE release 10 may be user equipment category 8. By letting the base station 603 know the user equipment category, it is able to determine the performance of the user equipment 605 and communicate with it accordingly.

As the base station 603 is of LTE release 10 and thus supports transmission mode 9, it has capabilities to detect both the user equipment category relating to LTE release 8/9 and the user equipment category relating to LTE release 10, e.g. user equipment category 5 and user equipment category 8 from the signaled information. These capabilities to detect both user equipment categories are predefined in the base station 603.

Step 702c

This step corresponds to step 702a in FIG. 7a and step 702b in FIG. 7b.

The base station 603, supporting transmission mode 9, selects one of the two alternative user equipment categories for the further communication with the user equipment 605, e.g. user equipment category 5. Based on the selected user equipment category, the base station 603 determines the soft buffer size based on user equipment category 5.

Step 703*c*

This step corresponds to step 703*a* in FIG. 7*a* and step 704*b* in FIG. 7*b*.

The user equipment 605 has not received any information indicating which of the at least two user equipment categories from the base station 603, so the user equipment 605 selects the default user equipment category, e.g. category 5, and determines a soft buffer size to be applied in its communication with the base station 603.

The user equipment 605 determines the default soft buffer size associated with user equipment category 3 if it is configured in at least one of transmission modes 1-8. This is because the user equipment 605 will not know if the base station 603 has understood that the user equipment 605 is of user equipment category 5 and 8. The user equipment 605 will determine a soft buffer size corresponding to its default user equipment category relating to LTE release 8/9 if it is configured with a transmission mode that is only available in LTE release 8/9.

The selected default user equipment category may be preconfigured in the user equipment 605.

Step 704*c*

This step corresponds to step 704*a* in FIG. 7*a* and step 705*b* in FIG. 7*b*.

The user equipment 605 and the base station 603 communicate according to the selected default user equipment category, i.e. user equipment category related to LTE release 8/9 which may be user equipment category 5. The user equipment 605 and the base station 603 apply the soft buffer size according to the selected default user equipment category related to LTE release 8/9, e.g. user equipment category 5, as determined in step 703*c*.

In other words, the base station 603 does not signal the selected user equipment category via the RRC protocol to the user equipment 605 in this example. Since both the user equipment 605 and the base station 603 apply the same soft buffer size, i.e. the soft buffer size according to LTE release 8/9, they have a common understanding of the soft buffer size which they shall apply in their communication, and thereby improved communication between the user equipment 605 and base station 603 in the communications network 600 is provided.

Figure 7D:
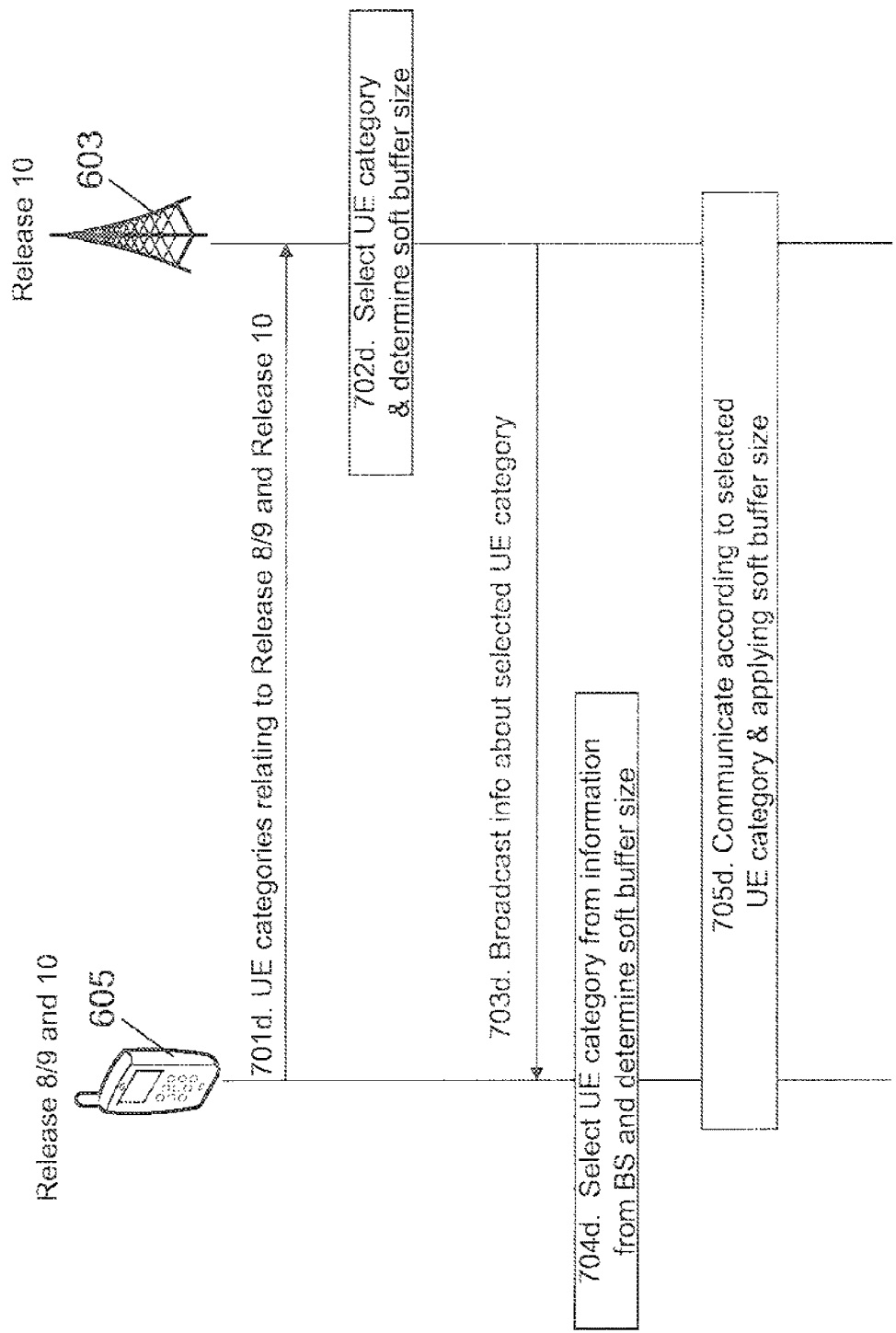

FIG. 7*d* illustrates an example of a base station 603 of a LTE release 10. The difference between FIG. 7*d* and FIGS. 7*a-c* is that the information about the selected user equipment category is broadcast, instead of signalled to one specified receiver. In the following example, the user equipment 605 is of the user equipment categories 5 and 8. The method comprises the following steps, which steps may as well be carried out in another suitable order than described below.

Step 701*d*

This step corresponds to step 701*a* in FIG. 7*a*, step 701*b* in FIG. 7 and step 701*c* in FIG. 7*c*.

The user equipment 605 signals its capability to handle two user equipment categories, one relating to LTE release 8/9 and the other relating to LTE release 10, to the base station 603. As mentioned above, the user equipment category related to LTE release 8/9 is user equipment category 5, and the category related to LTE release 10 is user equipment category 8. By letting the base station 606 know the user equipment category, it is able to determine the performance of the user equipment 605 and communicate with it accordingly.

As mentioned above, the base station 603 is of LTE release 10. The LTE release 10 base station 603 has capabilities to detect information from user equipment 605 on its capability to act according to user equipment categories related to both the LTE release 8/9 and the LTE release 10, e.g. user equipment category 5 and user equipment category 8. These capabilities to detect both user equipment categories are predefined in the base station 603.

Step 702*d*

This step corresponds to step 702*a* in FIG. 7*a*, step 702*b* in FIG. 7*b* and step 702*c* in FIG. 7*c*.

The base station 603 selects one of the two alternative user equipment categories for the further communication with the user equipment 605. Based on the selected user equipment category and the transmission mode 9 which the base station 603 supports, the base station 603 determines the soft buffer size.

Step 703*d*

According to this example, the base station 603 broadcasts to all user equipment's 605 in the communications network 600 that it comprehends LTE release 10 user equipment categories. The broadcasting is performed with the RRC protocol, e.g. by using a System Information Block (SIB). The broadcast information may e.g. be composed of an optional Information Element (IE) that is added in the end of an existing system information block as a so called non-critical extension. The absence of the information element means that the network side of the radio interface supports only user equipment categories related to LTE release 8/9 whereas the presence of the information element means that it supports both user equipment categories related to LTE release 8/9 and categories related to LTE release 10.

In one example, the user equipment 605 uses the soft buffer size according to its user equipment category related to LTE release 10, e.g. user equipment category 8. Otherwise, if the base station 603 does not broadcast the information element, it shall indicate a user equipment category related to LTE release 8/9 only, and use the corresponding soft buffer size. Implementation of the optional LTE release 10 extension at the base station 603 side does not create any interoperability problems because the user equipment 605 that is implemented according to an earlier release of the signaling syntax silently discards optional extensions that are not comprehended.

Step 704*d*

This step corresponds to step 703*a* in FIG. 7*a*, step 704*b* in FIG. 7 and step 703*c* in FIG. 7*c*.

The user equipment 605 determines, based on the broadcast selected user equipment category, e.g. category 8, and the transmission mode which the user equipment 605 is configured with, a soft buffer size to be applied in its communication with the base station 603. In other words, it re-determines or updates the soft buffer size.

Step 705*d*

This step corresponds to step 704*a* in FIG. 7*a*, step 705*b* in FIG. 7 and step 704*c* in FIG. 7*c*.

The user equipment 605 and the base station 603 communicate according to the selected user equipment category, e.g. category 8, and apply the determined soft buffer size Since both the user equipment 605 and the base station 603 apply the determined soft buffer size, they have a common understanding of the soft buffer size which they shall apply in their communication, and thereby improved communication between the user equipment 605 and base station 603 in the communications network 600 is provided.

In some embodiments, the user equipment 605 is configured with a transmission mode for a downlink communication from the base station 603 to the user equipment 605. The transmission mode relates to the bitrates that may be achieved over the communications channel. The user equipment 605 is configured to receive communication from the base station 603 according to the transmission mode. In some embodiments, the transmission mode is transmission mode 9. Transmission mode 9 is a multilayer transmission mode which supports both SU-MIMO and MU-MIMO transmission capabilities without the need for the user equipment 605 to be reconfigured via higher-layer signaling when switching between SU and MU transmission and reception on the shared data channel. Transmission mode 9 is based on the use of user equipment 605 specific RS for demodulation and CSI-RS for CSI estimation.

In some embodiments a user equipment 605 that is of user equipment category 6 or 7 also provides an additional user equipment category 4. The user equipment 605 determines which soft buffer size to apply based on which transmission mode the user equipment 605 is configured with. In other words, the user equipment 605 determines if it should apply its soft buffer size associated with user equipment category 1-5 or user equipment category 6-8, based on which transmission mode it is configured with. If the user equipment 605 is configured with transmission mode 1-8, the user equipment 605 applies the soft buffer size associated with its user equipment category 1-5. If the user equipment 605 is configured with transmission mode 9, it applies its soft buffer size according to user equipment category 6-8.

The information indicating what user category to apply in the mobile terminal as is signalled in step 703 from the base station 603 to the user equipment 605, is the configuration of transmission mode, it this particular embodiment. In this embodiment, the user equipment in step 704b, selects the user equipment category that is available only in release 10 if configured with transmission mode 9. If configured with any of transmission modes 1-8 a user equipment category that is available in release 8/9 is selected by the user equipment in step 704b.

Even though it is not explicitly described for all FIGS. 7a-d above, the user equipment 605 and the base station 603 has selected a default user equipment category, determined a corresponding soft buffer size and communicates according to the default user equipment category and determined soft buffer size before the user equipment 605 starts to send information about its user equipment categories related to LTE release 8/9 and LTE release 10. Therefore, the selection of user equipment category and determination of soft buffer size in e.g. step 702b is a selection of another user equipment category and a re-determination of the soft buffer size. The re-determined soft buffer size will then override the determined default soft buffer size.

Figure 8:
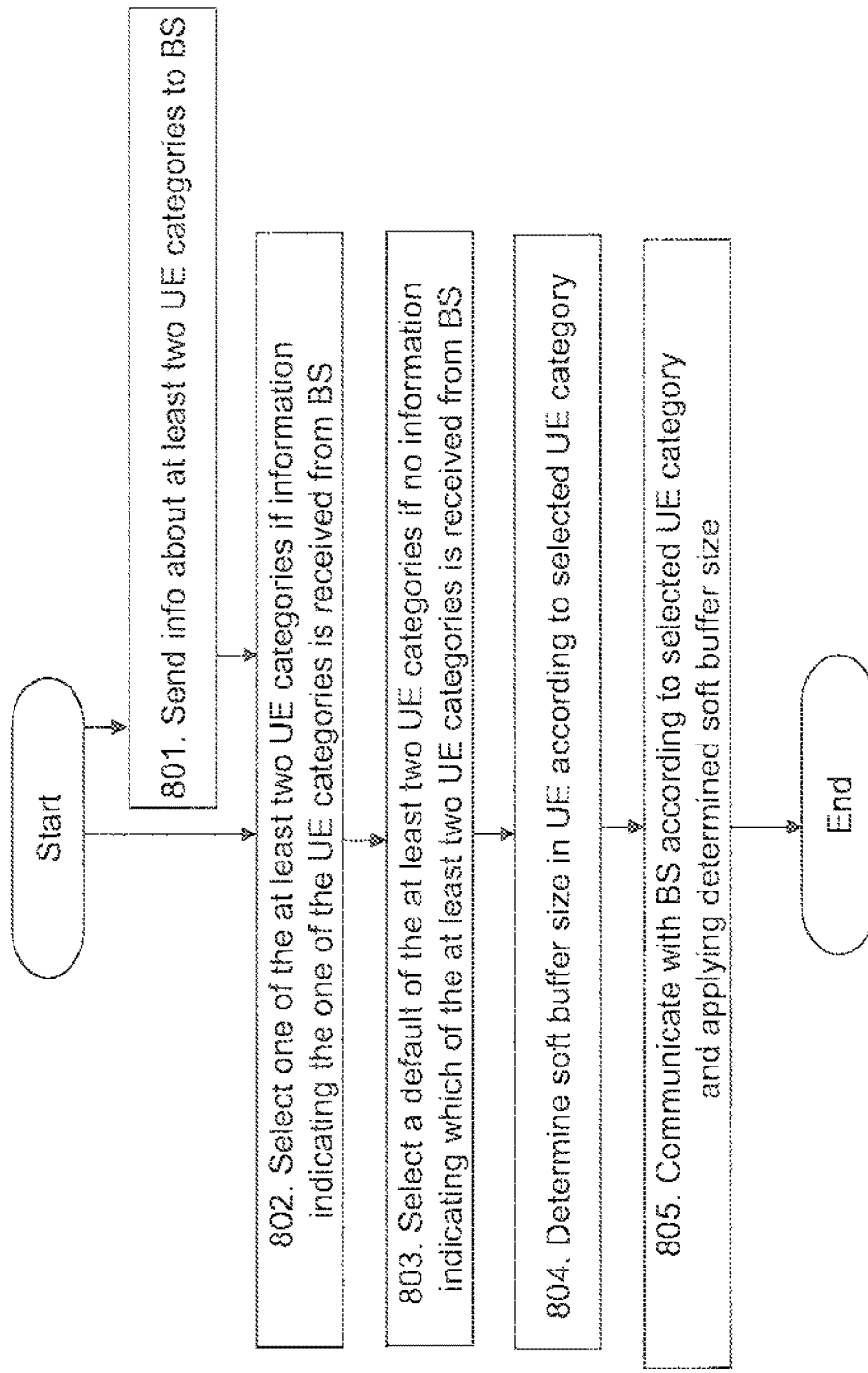
FIG. 8 is a flow chart illustrating embodiments of a method in a user equipment.

The method described above will now be described seen from the perspective of the user equipment 605. FIG. 8 is a flowchart describing embodiments of a method in the user equipment 605 for communicating with the base station 603 in the communications network 600. In some embodiments, the communication with the base station 603 is in the downlink direction from the base station 603 to the user equipment 605. As mentioned above, the user equipment 605 is configured to communicate with the base station 603 according to a selectable of at least two user equipment categories.

In some embodiments, the respective at least two user equipment categories are related to at least one of LTE release 8/9 and LTE release 10.

A user equipment category related to LTE release 8/9 may be of user equipment category 1-5, and a user equipment category related to LTE release 10 may have any of the categories 6-8, in addition to one of the user equipment categories 1-5.

The method comprises the following steps to be performed by the user equipment 605, which steps may be performed in any suitable order:

Step 801

This step corresponds to step 701a in FIG. 7a, step 701b in FIG. 7b, step 701c in FIG. 7c and step 701d in FIG. 7d.

The user equipment 605 sends or signals information about the at least two user equipment categories to the base station 603. In some embodiments, the information about the user equipment category is comprised in an information element.

The user equipment signaling of user equipment categories is defined in the following way. User equipment categories relating to LTE release 8/9 1-5 are signaled from the user equipment 605 to the base station 603 via the RRC protocol User equipment categories relating to LTE release 10 are signaled from the user equipment 605 to the base station 603 separately via the RRC protocol, using a LTE release 10 part of the RRC protocol. The receiver of the message is the base station 603, and it is also the base station 603 that uses the received information. In order to be able to operate in a legacy network, a LTE release 10 user equipment 605 that reports a user equipment category related to LTE release 10 would also report a user equipment category related to LTE release 8/9, e.g. 1-5 using a LTE release 8/9 part of the RRC protocol and a user equipment category related to LTE release 10 using a LTE release 10 part of the RRC protocol. The user equipment category related to LTE release 10 would be understood by a LTE release 10 base station 603, but not by the LTE release 8/9 base station 603. By doing so, the user equipment 605 may inform both legacy and new base stations 603 of its user equipment category.

Step 802

This step corresponds to step 704b in FIG. 7b and step 704d in FIG. 7d.

The user equipment 605 selects one of the at least two user equipment categories if information indicating the one of the at least two user equipment categories is received from the base station 603. In other words, the base station 603 has configured or told the user equipment 605 which of the at least two user equipment categories to use in communication with the base station 603. In some embodiments, the information about the selected user equipment category is comprised in an information element. The user equipment 605 receives a message from the base station 603 comprising information which indicates which of the at least two user equipment categories it shall apply.

In some embodiments, the information indicating the selected user equipment category of the at least two user equipment categories is received via the RRC protocol.

In some embodiment the information on the selected user equipment category is received in the form of the transmission mode that the base station 603 configures the user equipment 605 with. In this embodiment user equipment category is thereby selected based on the transmission mode that the user equipment 605 is configured with.

In some embodiments, the information indicating the selected user equipment category of the at least two user equipment categories is received via broadcast from the base station 603, for example in an information element.

Step 803

This step corresponds to step 703a in FIG. 7a and step 703c in FIG. 7c.

The user equipment 605 selects 803 a default of the at least two user equipment categories if no information indicating which of the at least two user equipment categories is received from the base station 603.

Information about the default user equipment category may be preconfigured in the user equipment 605.

The default of the at least two user equipment categories is the earliest of the at least two user equipment categories to have been released by standard.

Step 804

This step corresponds to step 703a in FIG. 7a, step 704b in FIG. 7b, step 703c in FIG. 7c and step 704d in FIG. 7d.

The user equipment 605 determines a soft buffer size of a soft buffer comprised in the user equipment 605 according to the selected user equipment category for downlink reception. As mentioned above, the selected user equipment category may be according to information indicated from the base station 603 or a default user equipment category. As mentioned above, the soft buffer size is determined based on the user equipment category. In some embodiments, the determining may be further based on transmission mode. In other words, the transmission mode may be used in combination with the user equipment category for the determining of the soft buffer size.

In some embodiments, the user equipment 605 is configured with a transmission mode for a downlink communication from the base station 603 to the user equipment 605. The user equipment 605 is configured to receive communication from the base station 603 according to the transmission mode. In some embodiments, the transmission mode is transmission mode 9.

The base station 603 determines which soft buffer size the user equipment 605 shall use based on the DL transmission mode. The user equipment 605 selects which soft buffer it shall apply based on which DL transmission mode it is configured with.

Step 805

This step corresponds to step 704a in FIG. 7a, step 705b in FIG. 7b, step 704c in FIG. 7c and step 705d in FIG. 7d.

The user equipment 605 communicates with the base station 603 according to the selected user equipment category and applying the determined soft buffer size. The communication is in a downlink direction from the base station 603 to the user equipment 605.

If the selected user equipment category is the default user equipment category, the communication continues according to the default user equipment category at least until information about a selected user equipment category is received from the base station 603.

The circular buffer $w_h$ for the r-th coded block may be generated as follows:

$$w_k = v_k^{(0)} \quad \text{for } k = 0, \ldots, K_\Pi - 1$$

$$w_{K_\Pi + 2k} = v_k^{(1)} \quad \text{for } k = 0, \ldots, K_\Pi - 1$$

$$w_{K_\Pi + 2k+1} = v_k^{(2)} \quad \text{for } k = 0, \ldots, K_\Pi - 1$$

where $K_1$ is a constant

The circular buffer has the length $K_{11}=3K_{11}$.

Denote the soft buffer size for the transport block by $N_{IR}$ bits and the soft buffer size for the r-th code block by $N_{ch}$ bits. The size $N_{ch}$ is obtained as follows, where C is the number of code blocks computed in section 5.1.2:

$$N_{cb} = \min\left(\left\lfloor \frac{N_{IR}}{C} \right\rfloor, K_w\right)$$

for downlink turbo codewhered transport channels $N_{cb}=K_{11}$ for uplink turbo coded transport channels
where $N_{IR}$ is equal to:

$$N_{IR} = \left\lfloor \frac{N_{soft}}{K_{MIMO} \cdot \min(M_{DL\_HARQ}, M_{limit})} \right\rfloor$$

where $N_{soft}$ is the total number of soft channel bit.

$K_{MIMO}$ is equal to 2 if the UE is configured to receive Physical Downlink Shared Channel (PDSCH) transmissions based on transmission modes 3, 4 or 8 as defined in section 7.1 of [3], 1 otherwise.

$M_{DL\_HARQ}$ is the maximum number of DL HARQ processes.

$M_{limit}$ is a constant equal to 8.

For example, if the user equipment 605 signals the parameter ue-Category-v10xy, and is configured with transmission mode 9 for the DL cell, N soft is the total number of soft channel bits according to the user equipment category indicated by the parameter ue-Category-v10xy. Otherwise, N soft is the total number of soft channel bits according to the user equipment category indicated by the parameter ue-Category.

For example and as mentioned earlier, a user equipment 605 indicating user equipment category 6 or 7 shall also indicate user equipment category 4. A user equipment 605 indicating user equipment category 8 shall also indicate user equipment category 5.

In some embodiments, the user equipment 605 applies as a default transmission mode 1 or transmission mode 2. If transmission mode 1 or transmission mode 2 is applied the user equipment 605 will apply a soft buffer size according to the user equipment category indicated by the parameter ue-Category. The base station 603 has the possibility to configure the user equipment 605 in transmission mode 9 in which case the user equipment 605 will change its soft buffer size to be according to the parameter ue-Category-v10xy.

Figure 9:
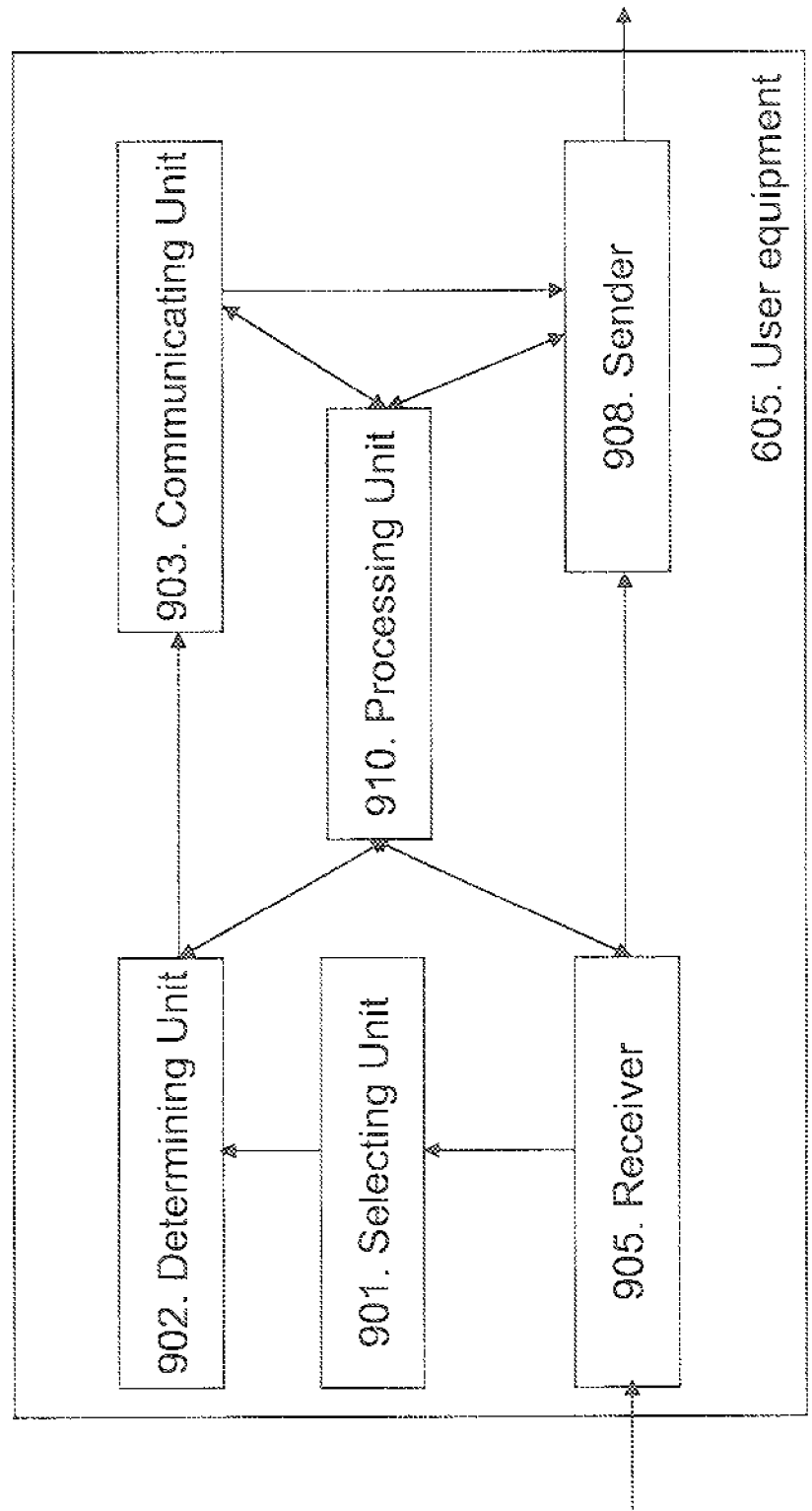
FIG. 9 is a schematic block diagram illustrating embodiments of a user equipment.

To perform the method steps shown in FIG. 8 for communicating with a base station 603 in a communications network 600 the user equipment 605 comprises an arrangement as shown in FIG. 9. The user equipment 605 is configured to communicate with the base station 603 according to a selectable of at least two user equipment categories. In some embodiments, the at least two user equipment categories are associated with at least one of release 8/9 of long term evolution, referred to as LTE, and with release 10 of LTE. One of the at least to user equipment categories may be a default user equipment category preconfigured in the user equipment 605.

In some embodiments, the user equipment 605 is configured with a transmission mode for downlink communication from the base station 603 to the user equipment 605. In some embodiments, the transmission mode is transmission mode 9. The base station 603 selects which soft buffer size the user equipment 605 shall use based on the transmission mode.

The user equipment 605 comprises a selecting unit 901 configured to select one of the at least two user equipment categories if information indicating the one of the at least two user equipment categories is received from the base station 603. The selecting unit 901 is further configured to select a default of the at least two user equipment categories if no information indicating which of the at least two user equipment categories is received from the base station 603. In some embodiments, the default of the at least two user equipment categories is the earliest of the at least two user equipment categories to have been released by standard.

The user equipment 605 comprises a determining unit 902 configured to determine a soft buffer size of a soft buffer comprised in the user equipment 605 according to the selected user equipment category. As mentioned above, the information about the selected user equipment category may be a preconfigured default user equipment category. In some embodiments, the information about the user equipment category is comprised in an information element. In some embodiments, the determining unit 902 is further configured to determine the soft buffer size based on a transmission mode.

The user equipment 605 further comprises a communicating unit 903 which is configured to communicate with the base station 603 according to the selected user equipment category and applying the determined soft buffer size. In some embodiments, the communication with the base station 603 is in the downlink direction from the base station 603 to the user equipment 605. In some embodiments, the communicating unit 903 is further configured to communicate with the base station according to the default user equipment category at least until information indicating the one of the at least to user equipment categories is received from the base station 603. The received information indicating the one of the at least two user equipment categories overrides the default user equipment category.

In some embodiments, the user equipment 605 comprises a receiver 905 configured to receive the information indicating the one of the at least two user equipment category from the base station 603. In other words, the base station 603 configures or tells the user equipment 605 which user equipment category to use in communication with the base station 603. In some embodiments, the receiver 905 is further configured to receive information indicating the selected user equipment category via the RRC protocol. In some embodiments, the receiver 905 is further configured to receive information indicating the selected user equipment category via broadcast from the base station 603. The information indicating the user equipment category may be comprised in an information element.

In some embodiments, the user equipment 605 further comprises a sender 908 which is configured to send information about the at least two user equipment categories to the base station 603. In some embodiments, the information about the user equipment category is comprised in an information element.

Figure 10A:
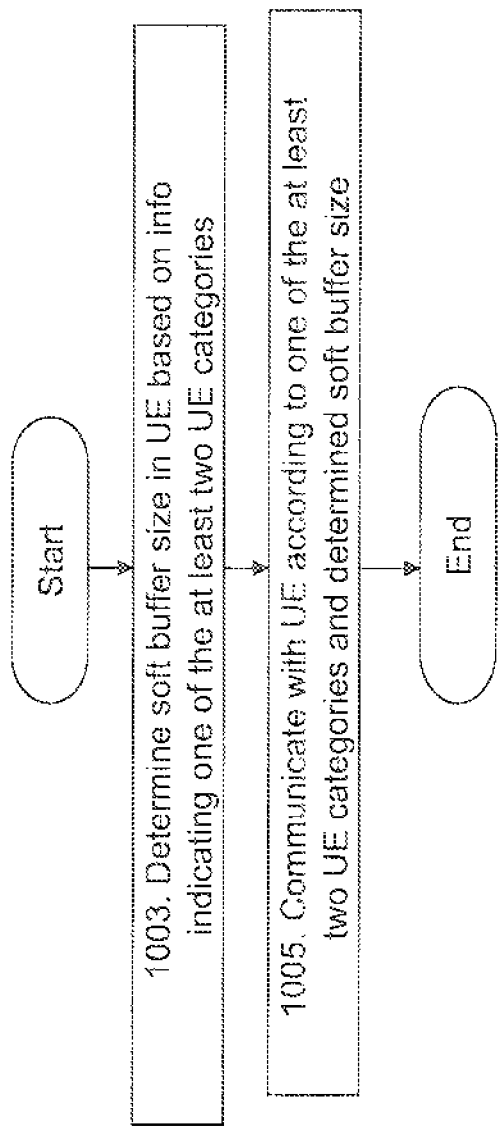
FIG. 10a-b are flow charts illustrating embodiments of a method in base station.
Figure 10B:
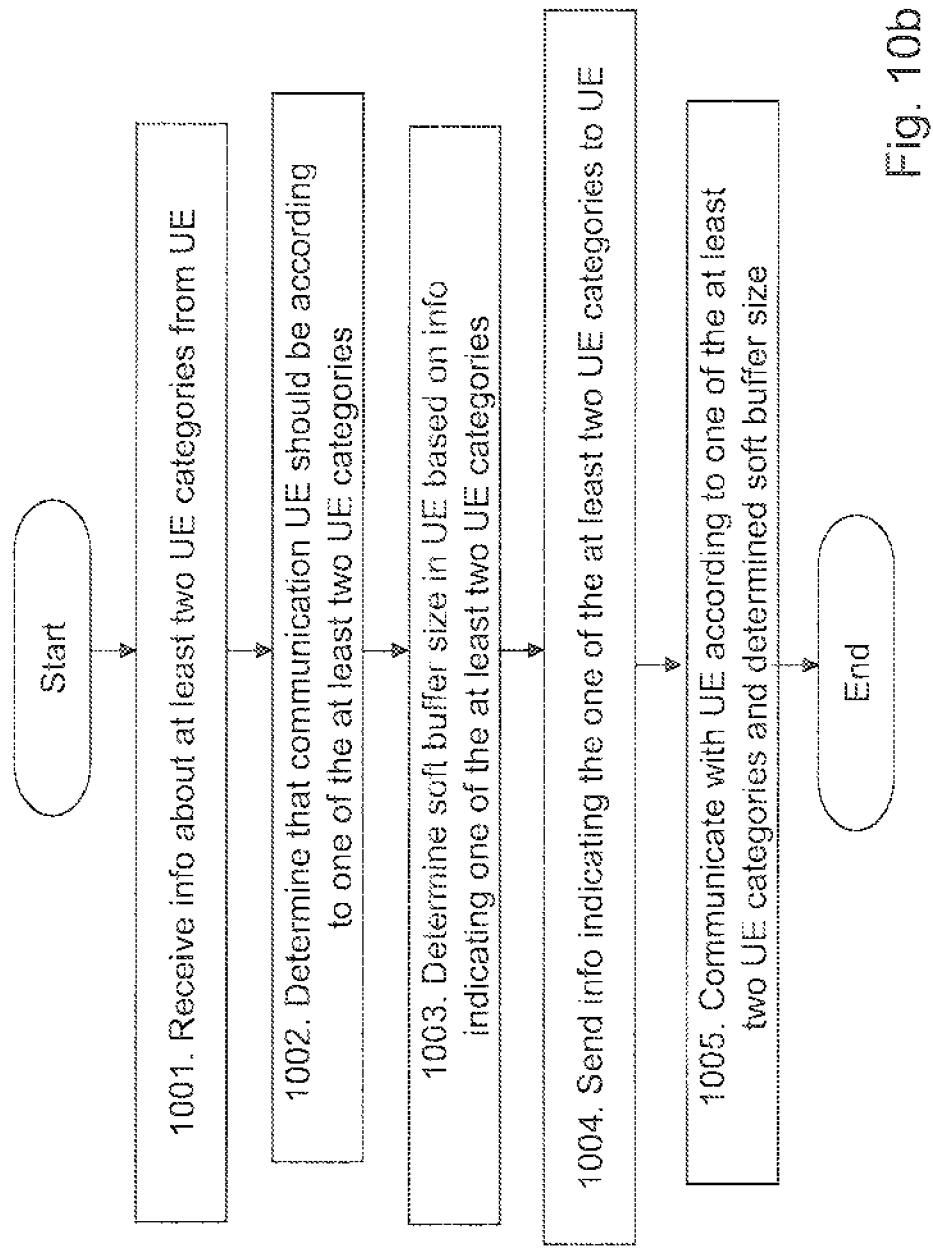

The method described above will now be described seen from the perspective of the base station 603. FIGS. 10a and b are flowcharts describing embodiments of the method in the base station 603 for communicating with the user equipment 605 in the communications network 600. FIG. 10a illustrates the main steps of the method and FIG. 10b illustrates all steps of the method. As mentioned above, the base station 603 is configured to communicate with the user equipment 605 according to a selectable of at least two user equipment categories, e.g. a first user equipment category and a second user equipment category.

In some embodiments, the at least two user equipment categories are associated with at least one of release 8/9 of long term evolution, referred to as LTE, and with release 10 of LTE. In some embodiments, the transmission mode as used on the communication link between the user equipment 605 and the base station 603 is used in combination with the user equipment category capability for determining the soft buffer size for DL reception. The transmission mode may be transmission mode 9. In some embodiments, the base station 603 communicates with a plurality of user equipment's, where one is the user equipment 605. The base station 603 handles the plurality of user equipment's according to different user equipment categories, depending for example on whether the user equipment's supports LTE release 10 or not. The base station 603 communicates with the user equipment 605 according to a selected default user equipment category and applies the corresponding determined soft buffer size. The communication is in a downlink direction from the base station 603 to the user equipment 605. This communication continues at least until information about a selected user equipment category is sent from the base station 603.

The method comprises the following steps to be performed by the base station 603, which steps may be taken in any suitable order:

Step 1001

This step is illustrated in FIG. 10b. This step corresponds to step 701a in FIG. 7a, step 701b in FIG. 7b, step 701c in FIG. 7c and step 701d in FIG. 7d.

The base station 603 receives information from the user equipment 605 about the user equipment capability to act according to the at least two user equipment categories. In some embodiments, the information about the user equipment category is comprised in an information element.

Step 1002

This step is illustrated in FIG. 10b. This step corresponds to step 702a in FIG. 7a, step 702b in FIG. 7b, step 702c in FIG. 7c and step 702d in FIG. 7d.

The base station 603 determines that the communication with the user equipment 605 should be according to one of the at least two user equipment categories.

Step 1003

This step is illustrated in FIGS. 10a and 10b. This step corresponds to step 702a in FIG. 7a, step 702b in FIG. 7b, step 702c in FIG. 7c, and step 702d in FIG. 7d.

Based on information indicating a selected user equipment category of the at least two user equipment categories, the base station 603 determines the soft buffer size comprised in the user equipment 605. In some embodiments, the determining the soft buffer size comprised in the user equipment 605 is based on a transmission mode. The transmission mode is used for communicating with the user equipment 605. In some embodiments, the transmission mode is transmission mode 9. In view of step 1001 described above, the user equipment 605 re-determines the soft buffer size.

The information about the selected user equipment category overrides the default user equipment category.

Step 1004

This step is illustrated in FIG. 10b. This step corresponds to step 703b in FIG. 7b and step 703d in FIG. 7d.

In some embodiments, the base station 603 sends information indicating the one user equipment category of the at least two user equipment categories to the user equipment 605. In other words, the base station 603 configures or tells the user equipment 605 which user equipment category of the at least two user equipment categories to use in communication with the base station 603. In some embodiments, the information indicating the selected user equipment category is comprised in an information element. In some embodiments, the information indicating the selected user equipment category is sent via the RRC protocol. In some embodiments, the information indicating the selected user equipment category is sent via broadcast to the user equipment 605.

Step 1005

This step is illustrated in FIGS. 10a and 10b. This step corresponds to step 704a in FIG. 7a, step 705b in FIG. 7b, step 704c in FIG. 7c and step 705d in FIG. 7d.

The base station 603 communicates with the user equipment 605 according to the selected user equipment category of the at least two user equipment categories and applies the determined soft buffer size. In some embodiments, the communication with the user equipment 605 is in the downlink direction from the base station 603 to the user equipment 605.

Figure 11:
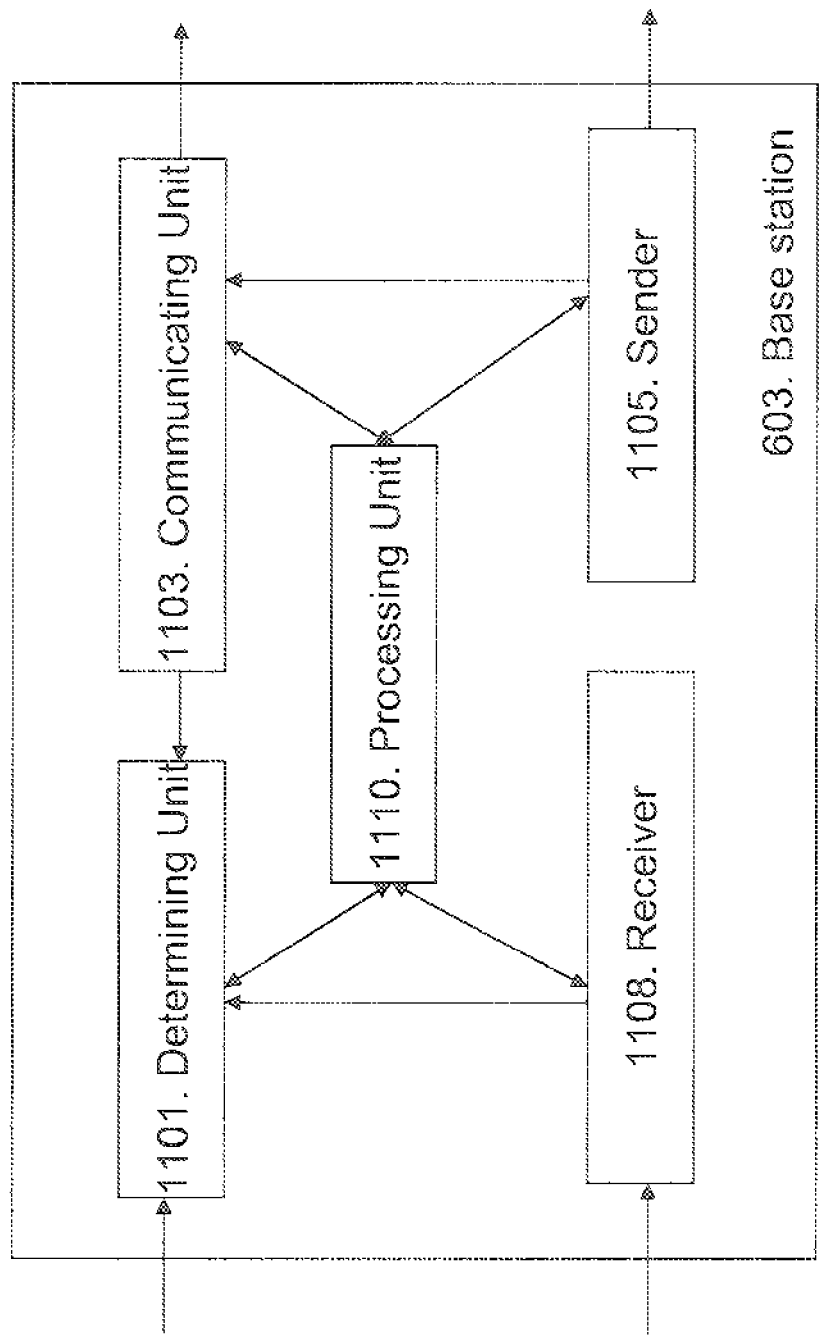
FIG. 11 is a schematic block diagram illustrating embodiments of a base station.

To perform the method steps shown in FIGS. 10a and 10b for communicating with a user equipment 605 in a communications network 600, the base station 603 comprises an arrangement as shown in FIG. 11. The base station 603 is configured to communicate with the user equipment 605 according to a selectable of at least two user equipment categories. In some embodiments, the at least two user equipment categories are associated with at least one of release 8/9 of LTE and release 10 of LTE.

The base station 603 comprises a determining unit 1101 configured to determine a soft buffer size comprised in the user equipment 605 based on information indicating one of the at least two user equipment categories. In some embodiments, the determining the soft buffer size comprised in the user equipment 605 is based on a transmission mode. The transmission mode is used for communicating with the user equipment 605. In some embodiments, the transmission mode is transmission mode 9. In some embodiments, the determining unit 1101 is further configured to determine that the communicating with the user equipment 605 should be according to the selected user equipment category.

The base station further comprises a communicating unit 1103 configured to communicate with the user equipment 605 according to the selected user equipment category of the at least two user equipment categories and applying the determined soft buffer size. The soft buffer size is determined by the user equipment 605. The base station 603 must adapt its transmission and retransmission according to the soft buffer size in the user equipment 605. The base station 603 will rate match the transport blocks it transmits to the user equipment 605 according to the soft buffer size.

In some embodiments, the base station 603 comprises a sender 1105 which is configured to send information indicating the selected user equipment category of the at least two user equipment categories to the user equipment 605. In other words, the base station 603 configures or tells the user equipment 605 which user equipment category of the at least two user equipment categories to use in communication with the base station 603. In some embodiments, the sending unit 1105 is further configured to send information indicating the selected user equipment category via a Radio Resource Control, referred to as RRC, protocol. The sending unit 1105 may further be configured to send information indicating the selected user equipment category via broadcast to the user equipment 605. In some embodiments, the information indicating the user equipment category is comprised in an information element.

In some embodiments, the base station 603 comprises a receiver 1108 which is configured to receive information about the at least two user equipment categories from the user equipment 605. In some embodiments, the information about the at least two user equipment categories is comprised in an information element.

The present mechanism for communication between a user equipment 605 and a base station 603 in a communication network 600 may be implemented through one or more processors, such as a processing unit 910 in the user equipment 605 depicted in FIG. 9 and a processing unit 1110 in the base station 603 depicted in FIG. 11, together with computer program code for performing the functions of the embodiments herein. The processor may be for example a Digital Signal Processor (DSP), Application Specific Integrated Circuit (ASIC) processor, Field-programmable gate array (FPGA) processor or microprocessor. The program code mentioned above may also be provided as a computer program product, for instance in the form of a data carrier carrying computer program code for performing the embodiments herein when being loaded into the user equipment 605 and/or base station 603. One such carrier may be in the form of a CD ROM disc. It is however feasible with other data carriers such as a memory stick. The computer program code can furthermore be provided as pure program code on a server and downloaded to the user equipment 605 and or base station 603 remotely.

Figure 12:
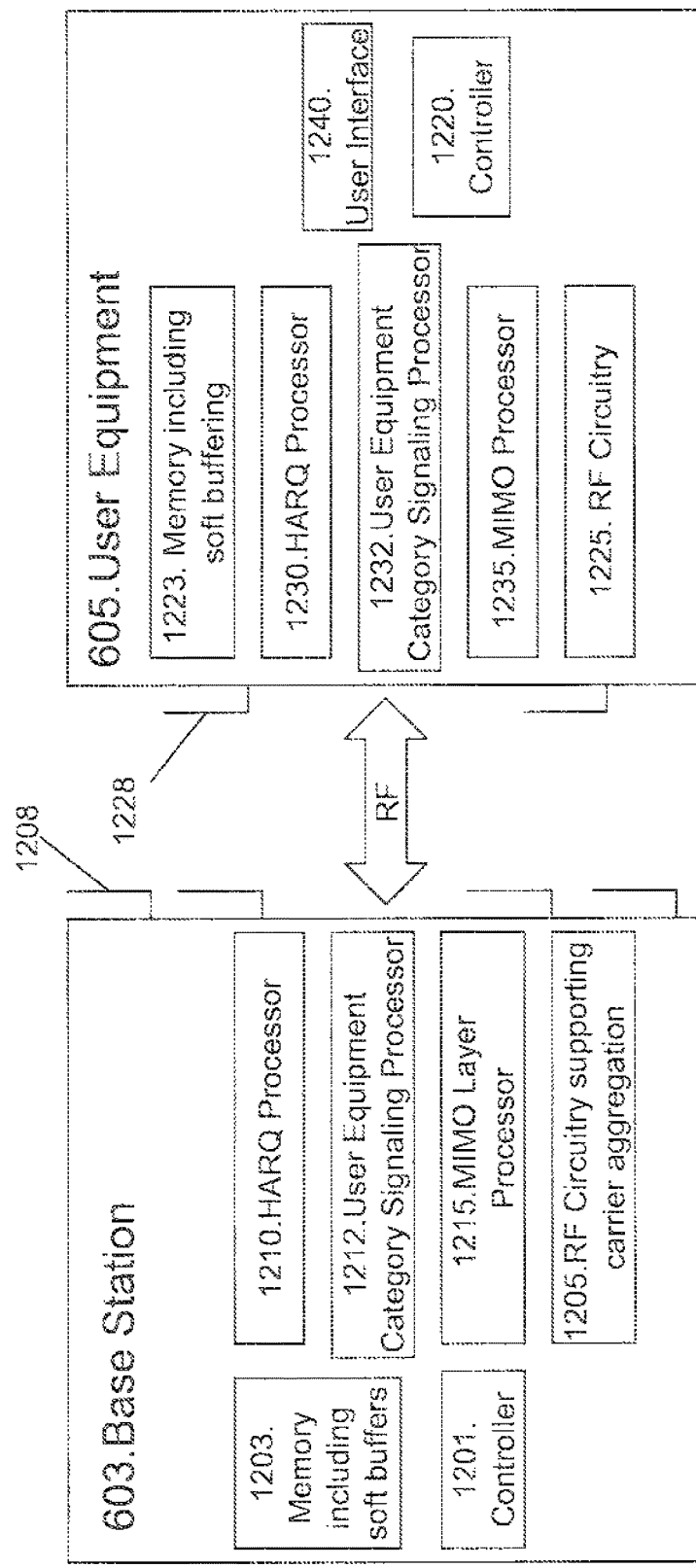
FIG. 12 is a diagrammatic view illustrating embodiments of a base station and a user equipment.

FIG. 12 illustrates non-limiting functional block diagrams illustrating embodiments of the base station 603 and the user equipment 605 for implementing the technology described above including the user equipment category signaling. The base station 603 includes an overall base station controller 1201 coupled to one or more memories 1203 that performs soft buffering. In relation to the user equipment 605, soft buffering may refer to performing rate matching according to the total amount of soft channel bits. In relation to the base station 603, soft buffering may refer to performing rate matching according to the total amount of soft channel bits. Radio Frequency (RF) circuitry 1205 is coupled to multiple antennas 1208 for performing radio transmission and reception for the base station. In FIG. 12, four antennas 1208 are shown as an example. The antennas 1208 in FIG. 12 corresponds to the sending unit 1105 and the receiving unit 1108 in FIG. 1. The example of FIG. 6 shows that carrier aggregation is supported. Multiple processors, corresponding to the processing unit 1110, the determining unit 1101 and the communicating unit 1103 in FIG. 1, are shown for performing corresponding tasks including HARQ processing 1210, user equipment category signaling processing 1212, and MIMO layer processing 1215.

The user equipment 605 comprises similar processing and memory blocks, and depending on its release, more or less sophistication, bandwidth, and other capabilities. The user equipment 605 comprises an overall user equipment controller 1220 coupled to one or more memories 1223 that performs soft buffering. A RF circuitry 1225 is coupled to multiple antennas 1228 for performing radio transmission and reception for the user equipment 605. In FIG. 12, two antennas 1228 are shown as an example. The antennas 1228 in FIG. 12 corresponds to the sending unit 908 and the receiving unit 905 in FIG. 9. Multiple processors, corresponding to the processing unit 910, determining unit 902 and the communicating unit 903 in FIG. 9, are shown for performing corresponding tasks including HARQ processing 1230, user equipment category signaling processing 1232, and MIMO layer processing 1235. The user equipment 605 further comprises a user interface 1240 for enabling communication with a user of the user equipment 605.

A user equipment 605 of release 10 and of any of the user equipment category 6-8 signal two different user equipment categories, one related to release 8/9 and the other related to release 10. The user equipment 605 signals the user equipment category related to LTE release 8 by the RRC parameter ue-category. That parameter indicates either user equipment category 4 or user equipment category 5, depending on which user equipment category related to LTE release 10 the user equipment 605 signals. In addition to this the user equipment 605 signals its LTE release 10 user equipment category by the RRC parameter ue-Category-v1020. The user equipment category related to LTE release 8 and user equipment category related to LTE release 10 has support of different number of maximum supported layers for spatial multiplexing.

The functional blocks of the base station 603 and wireless terminal 605 may be realized by a machine platform or electronic circuit which may take the form of a computer implementation or a hardware circuit, e.g., ASIC, implementation. In a computer implementation various functionalities as described herein are executed by a processor(s) or the like, further involving or invoking a memory, e.g. RAM, ROM, application memory, and, when necessary, various input and output devices.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and or computer-implemented, and thus machine-implemented.

In terms of hardware implementation, the functional blocks may include or encompass, without limitation, Digital Signal Processor (DSP) hardware, reduced instruction set processor, hardware, e.g. digital or analog, circuitry including but not limited to application specific integrated circuit(s) (ASIC), and, where appropriate, state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

Although the description above comprises many specificities, these should not be construed as limiting the scope of the embodiments herein but as merely providing illustrations of some of the embodiments herein. It will be appreciated that the scope of the embodiments herein fully encompasses other embodiments which may become obvious to those skilled in the art, and that the scope of the embodiments herein is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the embodiments herein, for it to be encompassed hereby.

In the following description, for purposes of explanation and not limitation, specific details are set forth such as particular architectures, interfaces, techniques, etc. in order to provide a thorough understanding of the embodiments herein. However, it will be apparent to those skilled in the art that the embodiments herein may be practiced in other embodiments that depart from these specific details. That is, those skilled in the art will be able to devise various arrangements which, although not explicitly described or shown herein, embody the principles of the embodiments herein and are included within its spirit and scope. In some instances, detailed descriptions of well-known devices, circuits, and methods are omitted so as not to obscure the description of the embodiments herein with unnecessary detail. All statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein may represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The invention claimed is:

1. A method in a user equipment for communicating with a base station in a communications network, wherein the user equipment is configured to communicate with the base station according to a selectable of at least two user equipment categories, the method comprising:
   selecting one of the at least two user equipment categories when information indicating the one of the at least two user equipment categories is received from the base station;
   determining a soft buffer size of a soft buffer comprised in the user equipment according to the selected user equipment category;
   communicating with the base station according to the selected user equipment category and applying the determined soft buffer size; and
   wherein the determining the soft buffer size comprised in the user equipment is based on a transmission mode; and wherein the user equipment is configured with the transmission mode for a downlink communication from the base station to the user equipment.

2. The method according to claim 1, wherein a default of the at least two user equipment categories is preconfigured in the user equipment, and wherein the user equipment communicates with the base station according to the default of the at least two user equipment categories at least until information indicating the one of the at least two user equipment categories is received from the base station, which received information indicating the one of the at least two user equipment category overrides the default of the at least two user equipment categories.

3. The method according to claim 2, wherein the default of the at least two user equipment categories is the earliest of the at least two user equipment categories to have been released by standard.

4. The method according to claim 1, wherein the information indicating the one of the at least two user equipment categories is received via a radio resource control, referred to as RRC, protocol.

5. The method according to claim 1, wherein the information indicating the one of the at least two user equipment categories is received via broadcast from the base station.

6. The method according to claim 1, further comprising: sending information about the at least two user equipment categories to the base station.

7. The method according to claim 1, wherein the transmission mode is transmission mode 9.

8. The method according to claim 1, wherein the at least two user equipment categories are associated with at least one of release 8/9 of long term evolution, referred to as LTE, and release 10 of LTE.

9. The method according to claim 1, further comprising selecting a default of the at least two user equipment categories if no information indicating which of the at least two user equipment categories is received from the base station.

10. A user equipment for communicating with a base station in a communications network, the user equipment being configured to communicate with the base station according to a selectable of at least two user equipment categories, the user equipment comprising:
a selecting unit configured to:
select one of the at least two user equipment categories when information indicating the one of the at least two user equipment categories is received from the base station;
a determining unit configured to determine a soft buffer size of a soft buffer comprised in the user equipment according to the selected user equipment category;
a communicating unit configured to communicate with the base station according to the selected user equipment category and applying the determined soft buffer size; and wherein the determining unit is further configured to determine that the soft buffer size is based on a transmission mode, and wherein the user equipment is configured with the transmission mode for a downlink communication from the base station to the user equipment.

11. The user equipment according to claim 10, wherein a default of the at least two user equipment categories is preconfigured in the user equipment, and
wherein the communicating unit is further is configured to communicate with the base station according to the default of the at least two user equipment categories at least until information indicating the one of the at least two user equipment categories is received from the base station, which received information indicating the one of the at least two user equipment categories overrides the default of the at least two user equipment categories.

12. The user equipment according to claim 11, wherein the default of the at least two user equipment categories is the earliest of the at least two user equipment categories to have been released by standard.

13. The user equipment according to claim 10, further comprising: a receiver configured to receive information indicating the one of the at least two user equipment categories via a Radio Resource Control, referred to as RRC, protocol.

14. The user equipment according, to claim 10, further comprising: a receiver configured to receive information indicating the one of the at least two user equipment categories via broadcast from the base station.

15. The user equipment according to claim 10, further comprising:
a sender configured to send information about the at least two user equipment categories to the base station.

16. The user equipment according to claim 10, wherein the transmission mode is transmission mode 9.

17. The user equipment according to claim 10, wherein the at least two user equipment categories are associated with at least one of release 8/9 of long term evolution, referred to as LTE, and release 10 of LTE.

18. The user equipment according to claim 10, the selecting unit further configured to select a default of the at least two user equipment categories if no information indicating which of the at least two user equipment categories is received from the base station.

* * * * *

UNITED STATES PATENT AND TRADEMARK OFFICE
CERTIFICATE OF CORRECTION

PATENT NO. : 10,484,312 B2
APPLICATION NO. : 16/016220
DATED : November 19, 2019
INVENTOR(S) : Gerstenberger et al.

It is certified that error appears in the above-identified patent and that said Letters Patent is hereby corrected as shown below:

In the Specification

In Column 1, Line 9, delete "2016," and insert -- 2016, now Pat. No. 10,153,990, --, therefor.

In Column 1, Line 9, delete "U,S.C." and insert -- U.S.C. --, therefor.

In Column 1, Line 11, delete "2012," and insert -- 2012, now abandoned, --, therefor.

In Column 1, Line 33, delete "and or" and insert -- and/or --, therefor.

In Column 1, Line 38, delete "and, or" and insert -- and/or --, therefor.

In Column 2, Line 8, delete "RNC's." and insert -- RNCs. --, therefor.

In Column 2, Line 12, delete "rcporting" and insert -- reporting --, therefor.

In Column 2, Line 34, delete "feedback" and insert -- feedback. --, therefor.

In Column 3, Line 5, delete "values bits." and insert -- values/bits. --, therefor.

In Column 7, Line 27, delete "sites" and insert -- sizes --, therefor.

In Column 7, Line 32, delete "sites." and insert -- sizes. --, therefor.

In Column 8, Line 3, delete "soil" and insert -- soft --, therefor.

In Column 9, Line 35, delete "FIG. 7a-d" and insert -- FIGS. 7a-d --, therefor.

In Column 9, Line 41, delete "FIG. 10a-b" and insert -- FIGS. 10a-b --, therefor.

Signed and Sealed this
Sixteenth Day of June, 2020

Andrei Iancu
*Director of the United States Patent and Trademark Office*

CERTIFICATE OF CORRECTION (continued)
U.S. Pat. No. 10,484,312 B2

In Column 10, Line 66, delete "category 6" and insert -- category 6. --, therefor.

In Column 11, Line 48, delete "previous earlier" and insert -- previous/earlier --, therefor.

In Column 13, Line 5, delete "communication" and insert -- communication. --, therefor.

In Column 13, Line 16, delete "LTE 1," and insert -- LTE --, therefor.

In Column 14, Line 18, delete "603c" and insert -- 603e --, therefor.

In Column 16, Line 61, delete "size" and insert -- size. --, therefor.

In Column 18, Line 22, delete "protocol" and insert -- protocol. --, therefor.

In Column 19, Line 54, delete "$w_h$" and insert -- $w_k$ --, therefor.

In Column 19, Lines 57-61, delete "
$$w_k - v_k^{(0)} \quad \text{for } k\; 0, \ldots, K_\Pi - 1$$
$$w_{K_\Pi + 2k} - v_k^{(1)} \quad \text{for } k\; 0, \ldots, K_\Pi - 1$$
$$w_{K_\Pi + 2k + 1} - v_k^{(2)} \quad \text{for } k\; 0, \ldots, K_\Pi - 1$$
" and insert --
$$w_k = v_k^{(0)} \quad \text{for } k = 0, \ldots, K_\Pi - 1$$
$$w_{K_\Pi + 2k} = v_k^{(1)} \quad \text{for } k = 0, \ldots, K_\Pi - 1$$
$$w_{K_\Pi + 2k + 1} = v_k^{(2)} \quad \text{for } k = 0, \ldots, K_\Pi - 1$$
--, therefor.

In Column 19, Line 64, delete "$K_1$" and insert -- $K_\Pi$ --, therefor.

In Column 19, Line 65, delete "$K_{11}\text{-}3K_{11}$." and insert -- $K_w = 3K_\Pi$. --, therefor.

In Column 19, Line 67, delete "$N_{ch}$" and insert -- $N_{cb}$ --, therefor.

In Column 20, Line 1, delete "$N_{ch}$" and insert -- $N_{cb}$ --, therefor.

In Column 20, Lines 1-2, delete "where $C$ is the number of code blocks computed in section 5.1.2:" and insert -- where C is the number of code blocks: --, therefor.

In Column 20, Lines 6-7, delete "$N_{cb} - \min\left(\left\lfloor \frac{N_{IR}}{C} \right\rfloor, K_w\right)$" and insert -- $N_{cb} = \min\left(\left\lfloor \frac{N_{IR}}{C} \right\rfloor, K_w\right)$ --, therefor.

In Column 20, Line 10, delete "$N_{ch}\text{-}K_{11}$" and insert -- $N_{cb} = K_\Pi$ --, therefor.

CERTIFICATE OF CORRECTION (continued)

In Column 20, Lines 15-18, delete "$N_{IR} - \left\lfloor \frac{N_{soft}}{K_{MIMO} \cdot \min(M_{DL\_HARQ}, M_{limit})} \right\rfloor$," and insert -- $N_{IR} = \left\lfloor \frac{N_{soft}}{K_{MIMO} \cdot \min(M_{DL\_HARQ}, M_{limit})} \right\rfloor$ --, therefor.

In Column 20, Line 19, delete "where" and insert -- where: --, therefor.

In Column 20, Lines 23-24, delete "based on transmission modes 3, 4 or 8 as defined in section 7.1 of [3], 1 otherwise." and insert -- based on transmission modes 3, 4 or 8, 1 otherwise. --, therefor.

In Column 20, Line 25, delete "$M_{DL\ HARQ}$" and insert -- $M_{DL\_HARQ}$ --, therefor.

In Column 20, Line 30, delete "N soft" and insert -- N_soft --, therefor.

In Column 20, Line 33, delete "N soft" and insert -- N_soft --, therefor.

In Column 24, Line 27, delete "and or" and insert -- and/or --, therefor.

In Column 25, Line 36, delete "and or" and insert -- and/or --, therefor.

In the Claims

In Column 28, Line 10, in Claim 11, delete "is further is" and insert -- is further --, therefor.

In Column 28, Line 28, in Claim 14, delete "according," and insert -- according --, therefor.

In Column 28, Line 42, in Claim 18, delete "claim 10," and insert -- claim 10, wherein --, therefor.